US009215017B2

(12) United States Patent
Kwon et al.

(10) Patent No.: US 9,215,017 B2
(45) Date of Patent: Dec. 15, 2015

(54) COMPUTING SYSTEM WITH DECODING SEQUENCE MECHANISM AND METHOD OF OPERATION THEREOF

(71) Applicant: Samsung Electronics Co., Ltd., Suwon-si, Gyeonggi-Do (KR)

(72) Inventors: Hyukjoon Kwon, San Diego, CA (US); Jungwon Lee, San Diego, CA (US); Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/305,484

(22) Filed: Jun. 16, 2014

(65) Prior Publication Data
US 2014/0369446 A1  Dec. 18, 2014

Related U.S. Application Data

(60) Provisional application No. 61/836,496, filed on Jun. 18, 2013.

(51) Int. Cl.
| | |
|---|---|
| *H04L 27/06* | (2006.01) |
| *H04B 17/345* | (2015.01) |
| *H04L 1/00* | (2006.01) |
| *H04B 17/318* | (2015.01) |

(52) U.S. Cl.
CPC ............ *H04B 17/345* (2013.01); *H04B 17/318* (2013.01); *H04L 1/005* (2013.01)

(58) Field of Classification Search
CPC ...... H04L 1/005; H04L 1/0045; H04L 1/0054
USPC .......................... 375/267, 340–341, 346–350
See application file for complete search history.

(56) References Cited

U.S. PATENT DOCUMENTS

| | | | | |
|---|---|---|---|---|
| 7,092,464 | B2 * | 8/2006 | Mills | 375/346 |
| 7,277,721 | B2 * | 10/2007 | Okumura et al. | 455/522 |
| 7,848,464 | B2 | 12/2010 | Hwang et al. | |
| 8,015,017 | B2 * | 9/2011 | Sung et al. | 704/500 |
| 8,306,493 | B2 * | 11/2012 | Gu | 455/214 |
| 8,332,708 | B2 * | 12/2012 | Nagaraja | 714/748 |
| 8,335,286 | B2 | 12/2012 | Mergen et al. | |
| 8,381,060 | B2 * | 2/2013 | Yoshimoto et al. | 714/748 |
| 8,423,862 | B2 * | 4/2013 | Yokomakura et al. | 714/755 |
| 8,462,873 | B2 * | 6/2013 | Park et al. | 375/285 |
| 8,619,917 | B2 * | 12/2013 | Chang et al. | 375/340 |

(Continued)

OTHER PUBLICATIONS

W.Raafat, M.Youssef, and I.Tarrad, "A comprehensive Survey on Various ICIC Schemes and Proposed 3G RF Interference Mitigation Techniques for OFDM Downlink on Cellular Networks", International Journal of Engineering Sciences & Research Technology, Raafat, 2(12) 3454-3463, Dec. 2013.

(Continued)

*Primary Examiner* — Emmanuel Bayard
(74) *Attorney, Agent, or Firm* — IP Investment Law Group

(57) ABSTRACT

A computing system includes: an inter-device interface configured to receive a receiver signal for representing a serving signal and an interference signal; a communication unit, coupled to the inter-device interface, configured to: dynamically generate a decoding target for decoding of the receiver signal, and decode the receiver signal based on the decoding target for decoding the receiver signal for the serving signal or the interference signal with an interference-aware receiver according to the decoding target.

20 Claims, 5 Drawing Sheets

(56) References Cited

U.S. PATENT DOCUMENTS

| | | | |
|---|---|---|---|
| 8,731,553 B2* | 5/2014 | Choi et al. | 455/435.2 |
| 8,744,023 B1* | 6/2014 | Song et al. | 375/346 |
| 8,755,459 B2* | 6/2014 | Nentwig | 375/316 |
| 8,761,088 B2* | 6/2014 | Matsumoto et al. | 370/328 |
| 8,767,895 B2* | 7/2014 | Reial | 375/346 |
| 8,774,301 B1* | 7/2014 | Palanivelu et al. | 375/262 |
| 8,792,594 B2* | 7/2014 | Vojcic et al. | 375/340 |
| 8,879,647 B2* | 11/2014 | Ashikhmin et al. | 375/260 |
| 8,918,054 B2* | 12/2014 | Wu et al. | 455/63.1 |
| 8,938,038 B2* | 1/2015 | Reial et al. | 375/346 |
| 9,001,910 B1* | 4/2015 | Choi et al. | 375/260 |
| 2002/0044614 A1* | 4/2002 | Molnar et al. | 375/346 |
| 2006/0039315 A1* | 2/2006 | Bi et al. | 370/328 |
| 2006/0172716 A1* | 8/2006 | Yoshii et al. | 455/226.1 |
| 2007/0149135 A1* | 6/2007 | Larsson et al. | 455/67.13 |
| 2009/0197606 A1* | 8/2009 | Bergman et al. | 455/438 |
| 2009/0245432 A1* | 10/2009 | Matsumoto et al. | 375/341 |
| 2009/0290516 A1* | 11/2009 | Han et al. | 370/277 |
| 2010/0118791 A1* | 5/2010 | Shinozaki | 370/328 |
| 2010/0318876 A1* | 12/2010 | Yokomakura et al. | 714/752 |
| 2011/0200088 A1* | 8/2011 | Koslov et al. | 375/227 |
| 2012/0115517 A1* | 5/2012 | Ibing et al. | 455/500 |
| 2012/0163473 A1* | 6/2012 | Laroche et al. | 375/240.24 |
| 2013/0109431 A1* | 5/2013 | Zhang et al. | 455/522 |
| 2013/0155967 A1 | 6/2013 | Kang et al. | |
| 2013/0156139 A1 | 6/2013 | Lee et al. | |
| 2013/0267266 A1* | 10/2013 | Park et al. | 455/501 |
| 2014/0295909 A1* | 10/2014 | Ouchi et al. | 455/522 |
| 2014/0307569 A1* | 10/2014 | Barbieri et al. | 370/252 |
| 2015/0003397 A1* | 1/2015 | Agrawal et al. | 370/329 |

OTHER PUBLICATIONS

H.Kwon, J.Lee, and I.Kang, "Interference Mitigation via Interference-Aware Successive Decoding", http://arxiv.org/pdf/1209.3824.pdf, Sep. 2012.

D.Gesbert, S.Hanly, H.Huang, S.S.Shitz, O.Simeone, and W.Yu; "Multi-Cell MIMO Cooperative Networks: A New Look at Interference", IEEE Journal on Selected Areas in Communications, vol. 28, No. 9, Dec. 2010.

Y.Zhao, C.W.Tan, A.S.Avestimehr, S.N.Diggavi, and G.J.Pottie; "On the Sum-Capacity with Successive Decoding in Interference Channels", http://arxiv.org/pdf/1103.0038.pdf, Mar. 2011.

F. Baccelli, A. E. Gamal, and D. N. C. Tse, "Interference networks with point-to-point codes," IEEE Trans. Inf. Theory, vol. 57, pp. 2582-2596, May 2011.

B.Bandemer, A.E. Gamal, and Y.H. Kim, "Simultaneous nonunique decoding is rate-optimal," Proceedings of the 50th Annual Allerton Conference on Communication, Control, and Computing, Monticello, Illinois, Oct. 2012.

J.W. Choi; A.C. Singer; J.Lee; N.Cho, "Improved linear soft-input soft-output detection via soft feedback successive interference cancellation," Communications, IEEE Transactions on, vol. 58, No. 3, pp. 986,996, Mar. 2010.

Suarez, A.; Debbah, M.; Cottatellucci, L.; Altman, E., "Optimal decoding order under target rate constraints," Signal Processing Advances in Wireless Communications, 2007. SPAWC 2007. IEEE 8th Workshop on , vol., no., pp. 1,5, Jun. 17-20, 2007.

* cited by examiner

COMPUTING SYSTEM WITH DECODING SEQUENCE MECHANISM AND METHOD OF OPERATION THEREOF

CROSS-REFERENCE TO RELATED APPLICATION(S)

This application claims the benefit of U.S. Provisional Patent Application Ser. No. 61/836,496 filed Jun. 18, 2013, and the subject matter thereof is incorporated herein by reference thereto.

TECHNICAL FIELD

An embodiment of the present invention relates generally to a computing system, and more particularly to a system with decoding sequence mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication effectively experience various types of hindrances from numerous sources, as well as computational complexities rising from numerous possible formats for communicated information, which affect the quality and speed of the accessible data.

Thus, a need still remains for a computing system with decoding sequence mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a computing system, including: an inter-device interface configured to receive a receiver signal for representing a serving signal and an interference signal; a communication unit, coupled to the inter-device interface, configured to: dynamically generate a decoding target for decoding of the receiver signal, and decode the receiver signal based on the decoding target for decoding the receiver signal for the serving signal or the interference signal with an interference-aware receiver according to the decoding target.

An embodiment of the present invention provides a method of operation of a computing system including: receiving a receiver signal for representing a serving signal and an interference signal; dynamically generating a decoding target for decoding of the receiver signal; and decoding the receiver signal based on the decoding target for decoding the receiver signal for the serving signal or the interference signal with an interference-aware receiver according to the decoding target.

An embodiment of the present invention provides a non-transitory computer readable medium including instructions for operating a computing system including: receiving a receiver signal for representing a serving signal and an interference signal; dynamically generating a decoding target for decoding of the receiver signal; and decoding the receiver signal based on the decoding target for decoding the receiver signal for the serving signal or the interference signal with an interference-aware receiver according to the decoding target.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
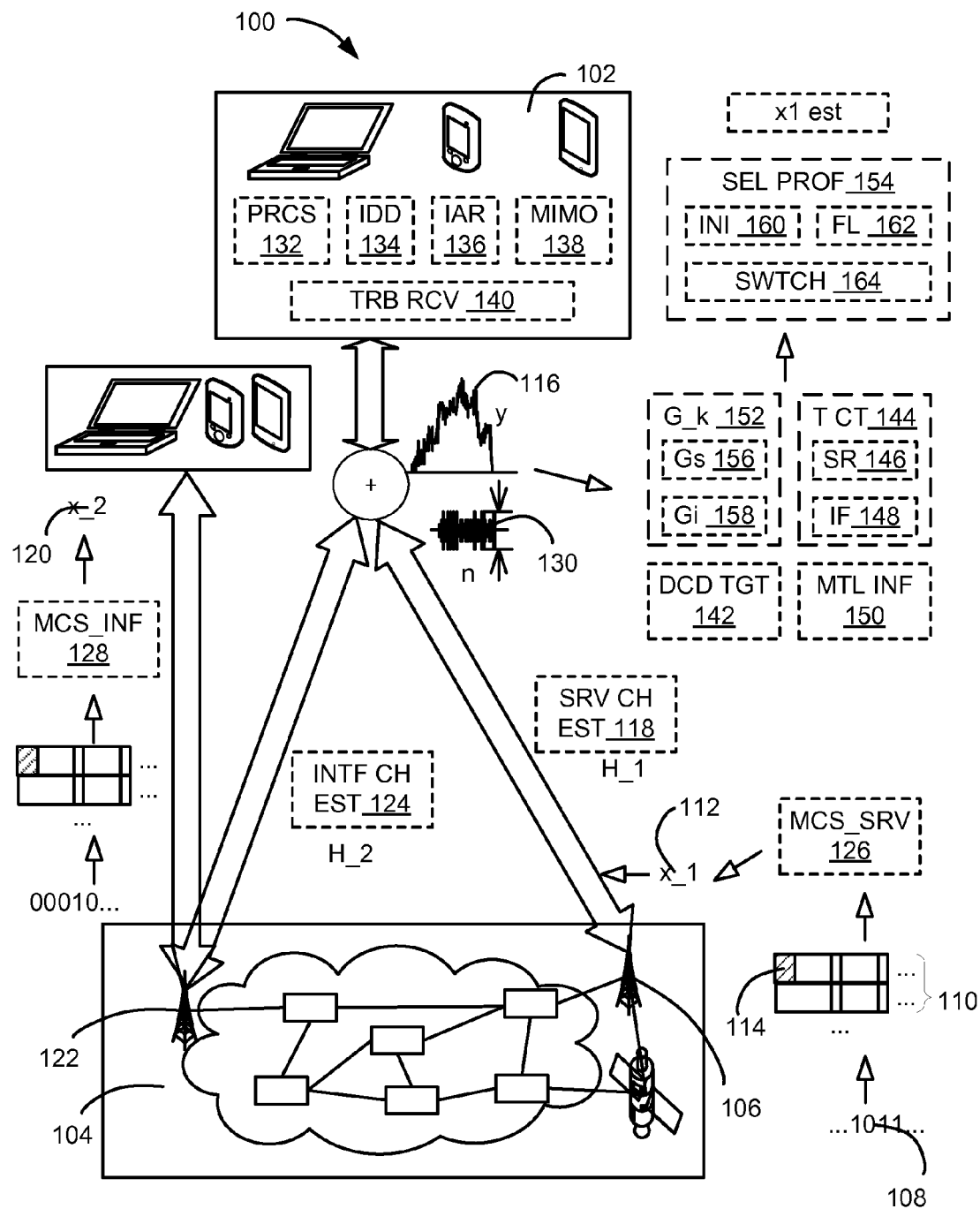
FIG. 1 is a computing system with decoding sequence mechanism in an embodiment of the present invention.

The following embodiments of the present invention can be used to dynamically control the decoding sequence. A decoding target can be generated as a serving target or an interference target for decoding a receiver signal for a serving signal or an interference signal therein. The decoding target can be generated as the serving target for decoding for the serving signal. The decoding target can be generated as the interference target for decoding for the interference signal. The decoding target can be generated based on a selection profile.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

The term "processing" as used herein includes manipulating signal and corresponding data, such as filtering, detecting, decoding, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a computing system 100 with decoding sequence mechanism in an embodiment of the present invention. The computing system 100 includes a first device 102, such as a mobile device including a cellular phone or a notebook computer, connected to a network 104. The network 104 is a system of wired or wireless communication devices or means that are connected to each other for enabling communication between devices.

For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks.

The computing system 100 can include a second device 106 for directly or indirectly linking and communicating with the first device 102. The network 104 can include the second device 106. The second device 106 can receive wireless signals from the first device 102, transmit signals to the first device 102, process signals, or a combination thereof. The second device 106 can also relay signals between other base stations, components within the network 104, or a combination thereof.

The first device 102 can be connected to the network 104 through the second device 106. For example, the second device 106 can be a base station, a router, a modem, or a combination thereof. Also for example, the second device 106 can be a communication device or a processing component included or with a cell tower, a wireless router, an antenna, or a combination thereof being used to communicate with, such as by sending signals to or receiving signals from, the first device 102 including a mobile computing device.

The first device 102 can connect to and communicate with other devices, such as other mobile devices, servers, computers, telephones, or a combination thereof. For example, the first device 102 can communicate with other devices by transmitting signals, receiving signals, processing signals, or a combination thereof and displaying a content of the signals, audibly recreating sounds according to the content of the signals, processing according to the content, such as storing an application or updating an operating system, or a combination thereof.

The second device 106 can be used to wirelessly exchange signals for communication, including voice signals of a telephone call or data representing a webpage and interactions therewith. The second device 106 can also transmit reference signals, training signals, error detection signals, error correction signals, header information, transmission format, protocol information, or a combination thereof.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include a reference portion, a header portion, a format portion, an error correction or detection portion, or a combination thereof imbedded in the communicated information. The reference portion, header portion, format portion, error correction or detection portion, or a combination thereof can include a predetermined bit, pulse, wave, symbol, or a combination thereof. The various portions can be embedded within the communicated signals at regular time intervals, frequency, code, or a combination thereof.

The second device 106 can communicate serving content 108 intended for the first device 102. The serving content 108 can include data from a transmitting device intended for communication by reproduction or processing at a receiving device. For example, the serving content 108 can be a sequence of bits intended for displaying, audibly recreating, executing instructions, storing, or a combination thereof at a receiving device, such as the first device 102.

The second device 106 can modify the serving content 108 to generate a code word 110 for communicating the serving content 108. The code word 110 is a unit of information having a length and a format predetermined by the computing system 100, a standard, a known routine, or a combination thereof for communicating information between devices.

For example, the code word 110 can be based on a turbo coding scheme or a polar coding scheme. The code word 110 can be a processing result of interleaving or de-interleaving the code word 110, adding format or supporting information, such as error processing information or header information, or a combination thereof.

The second device 106 can further utilize a modulation-coding scheme (MCS) to communicate the serving content 108. The modulation-coding scheme is a mechanism for controlling transmission of information. The modulation-coding scheme can include controls for number of spatial streams, modulation type, coding rate, or a combination thereof. The modulation-coding scheme can control a communication rate or a data rate.

The computing system 100 can use one or more instances of the code word 110 and the modulation-coding scheme to generate and transmit a serving signal 112. The serving signal 112 can be data actually transmitted by a device for communication and having a format for transmission. The serving signal 112 can be represented as 'x'.

The serving signal 112 can include a reference portion 114. The reference portion 114 is a known signal transmitted by a device that is used to determine various types of information at a receiving device. The reference portion 114 can include a bit, a symbol, a signal pattern, a signal strength, frequency, phase, duration, or a combination thereof predetermined by the computing system 100, a standard, or a combination thereof. The details of the reference portion 114 can be known and used by one or all devices in the computing system 100.

The reference portion 114 can include generic information, cell-specific information, or a combination thereof. The reference portion 114 can further include information regarding a transmission format. The detail, the structure, the content, or a combination thereof for the reference portion 114 can be used by the receiving device, such as the first device 102, to determine information regarding a mechanism used to transmit data. The serving signal 112 can be based on single-input single output (SISO) communication scheme, a point-to-point communication scheme, or a multiple-input multiple-output (MIMO) communication scheme.

The serving signal 112 can traverse a serving channel and be detected as part of a receiver signal 116 at the intended receiver. The serving signal 112 can be altered from traversing the serving channel. The altering effects of the serving channel can be characterized by a serving channel estimate 118. For example, the serving channel estimate 118 can represent fading, distortions or alterations from delayed signals or echoes, or a combination thereof of the serving channel.

The computing system 100 can calculate the serving channel estimate 118 using the reference portion 114 or a segment in the receiver signal 116 corresponding to the reference portion 114 of the serving signal 112. The estimate of communication channel, including the serving channel estimate 118, can be represented as 'H'.

The receiver signal 116 can be information received or detected at a device. The receiver signal 116 can include the serving signal 112 or a derivation thereof. The receiver signal 116 can further include information unintended for communication with the receiving device. For example, the receiver signal 116 can include an interference signal 120 from an interference source 122 traversing an interference channel, which can be characterized with an interference channel estimate 124, a noise portion 130, or a combination thereof.

The interference signal 120 can include data unintended for communication at the receiving device. The interference signal 120 can include data or information having similar format or use as the serving content as described above, but intended for communication with a different device and received by the first device 102 or for a purpose not currently utilized by the first device 102.

The interference source 122 can include a device or a portion therein transmitting the interference signal 120 for communicating with a device different from the receiving device. The interference source 122 can include a device other than the first device 102, the second device 106, or a combination thereof.

For illustrative purposes, the interference signal 120 is described as originating from the interference source 122. However, it is understood that the interference signal 120 can be originated from the first device 102, the second device 106, or a combination thereof communicating information unintended for exchange between the first device 102 and the second device 106.

The interference signal 120 can include the reference portion 114 corresponding to the interference source 122 or specific for the interference signal 120. The reference portion 114 for the interference signal 120 can be similar to the reference portion 114 of the serving signal 112, but unique for the interference source 122, the interference signal 120, or a combination thereof.

The interference signal 120 can traverse the interference channel similarly as the serving signal 112 but unique to the interference signal 120. The interference channel can be characterized by the interference channel estimate 124. The interference channel estimate 124 can be similar to the serving channel estimate 118, but representing signal altering effects unique for the receiving device and the interference source 122. The computing system 100 can determine the interference channel estimate 124, the serving channel estimate 118, or a combination thereof based on the reference portion 114 associated thereto.

The computing system 100 can further process the receiver signal 116 based on the modulation-coding scheme specific to the interference signal 120, the serving signal 112, or a combination thereof. For example, the computing system 100 can use a serving scheme 126, an interference scheme 128, or a combination thereof. The serving scheme 126 can be the modulation-coding scheme specific for the serving signal 112. The interference scheme 128 can be the modulation-coding scheme specific for the interference signal 120.

The noise portion 130 can include error or deviations in the data. The noise portion 130 can be from a processing channel or a route for the data, hardware components processing signals, background noise, or a combination thereof. The noise portion 130 can also include changes in the signal or the data due to hardware component limitations, such as tolerance levels or cross-talk between components.

The noise portion 130 can be additive in nature and have a random Gaussian or Rayleigh distribution for the changes. The noise portion can also be independent and identically distributed (i.i.d.) sequence of uncorrelated circularly symmetric complex Gaussian random vector with zero mean. The noise portion 130 can be represented as 'n'.

The noise portion 130 can be characterized by a noise measure. The noise measure can include a quantitative representation of the noise portion. The noise measure can be a statistical characteristic of the noise portion 130. The noise measure can be a variance or a covariance value, a measure of spread, distancing, density, power, or a combination thereof for the noise portion 130. The noise measure can be known or detectable to the computing system 100. The noise measure can be represented as '$\sigma^2$'.

The receiver signal 116 can be represented as:

$$y = \sqrt{P_1}H^1x^1 + \sqrt{P_2}H^2x^2 + n.$$  Equation (1).

The term 'P' can represent an effective channel gain combined with transmitter power. The superscripts '1' and '2' can represent correspondence or association to the serving signal 112 and the interference signal 120, respectively.

For example, '$H^1$' can represent the serving channel estimate 118 and '$x^1$' can represent the serving signal 112. Also for example, the term '$H^2$' can represent the interference channel estimate 124, and the term '$x^2$' can represent the interference signal 120.

The computing system 100 can include a receiver processing mechanism 132, an iterative detection-decoding mechanism 134, an interference-aware receiver 136, a multiple stream receiver 138, a turbo receiver 140, or a combination thereof. The first device 102, the second device 106, or a combination thereof can include the receiver processing mechanism 132, the iterative detection-decoding mechanism 134, the interference-aware receiver 136, the multiple stream receiver 138, the turbo receiver 140, or a combination thereof for processing the receiver signal 116.

The receiver processing mechanism 132 is an overall process, method, architecture, or a combination thereof for processing the receiver signal 116. The receiver processing mechanism 132 can include statistical models or estimates. For example, the receiver processing mechanism 132 can include maximum a posteriori (MAP) mechanism or a derivation thereof, such as max-log-MAP (MLM), for the receiving device, such as the first device 102 or a portion therein.

The iterative detection-decoding (IDD) mechanism 134 is a method or process for determining the serving content 108 from the receiver signal 116 through repeated processing and interaction between the detection process and the decoding process. The iterative detection-decoding mechanism 134 can include a direct coupling and interaction between a detection process, for recognizing symbols or information from detecting signals, and a decoding process, for recognizing content information from recognized symbols or detected information.

The iterative detection-decoding mechanism 134 can include a feed-forward information from the detection process to the decoding process, a feed-back information from the decoding process to the detection process or a combination thereof. The iterative detection-decoding mechanism 134 can use the result of the detection process for the decoding process, the result of the decoding process for the detection process, or a combination thereof.

The interference-aware receiver (IAR) 136 is a device or a portion thereof configured to process and utilize a signal received at the receiving device but unintended for the receiving device. The interference-aware receiver 136 can be the device or the portion thereof recognizing and utilizing the information in the interference signal 120 in the receiver signal 116 to process for the serving content 108. The interference-aware receiver 136 can recognize the content of the interference signal and remove it from the receiver signal 116 to process for the serving content 108.

The interference-aware receiver 136 can include an interference aware detector, decoder, or a combination thereof. The interference-aware receiver 136 can further include a joint detector, decoder, or a combination thereof configured to recognize, whiten, cancel or remove, detect, decode, or a combination thereof for interference signal in processing the serving signal 112.

The interference-aware receiver 136 can further include an interference-aware successive decoding (IASD) mechanism for processing for either the serving signal 112 or the interference signal 120 for each processing iteration or session. The interference-aware receiver 136 can use the IASD to process the serving signal 112 and the interference signal 120 using multiple iterations or sessions, each uniquely processing either the serving signal 112 or the interference signal 120.

The multiple stream receiver 138 is a device or a portion therein configured to communicate with multiple instances of streams or layers for communicating information. The multiple stream receiver 138 can use communication dedicated for multiple transmission source, multiple receiving points, or a combination thereof. The multiple stream receiver 138 can be the device or the portion therein for the MIMO communication scheme. The multiple stream receiver 138 can include a MIMO detector.

The turbo receiver 140 is a device or a portion therein configured to utilize utilizing a-priori, a-posteriori, and extrinsic values based on calculating outcomes in a structure or a process without using a previous outcome of the structure or the process. The turbo receiver 140 can calculate an extrinsic value, interleave or de-interleave data, or a combination thereof based on an output value or an a-posteriori value. The turbo receiver 140 can use the extrinsic value from a different process or a different structure as an a-priori value. The turbo receiver 140 can include a turbo detector or a turbo decoder.

The computing system 100 can include a device profile for describing the first device 102, the second device 106, or a combination thereof. The device profile can describe the device receiving and processing the receiver signal 116. The device profile can describe a circuit, a component, a software, a configuration, or a combination thereof for the receiver processing mechanism 132, the iterative detection-decoding mechanism 134, the interference-aware receiver 136, the multiple stream receiver 138, the turbo receiver 140, or a combination thereof utilized by the receiving device for processing the receiver signal 116 to recover the serving content 108.

The computing system 100 can recognize and decode both the serving signal 112 and the interference signal 120 or portions corresponding thereto in the receiver signal 116. The computing system 100 can decode for the serving signal 112 and the interference signal 120 from the receiver signal 116 at the receiving device, such as the first device 102.

The computing system 100 can use iterations or sessions each targeted for processing and decoding either the serving signal 112 or the interference signal 120. The computing system 100 can dynamically generate a decoding target 142 for the decoding process for each iteration or session. The decoding target 142 can include a portion of the receiver signal 116 or an originally corresponding transmission sought during a decoding iteration or a decoding session.

The computing system 100 can generate the decoding target 142 based on a target category 144 indicating a serving target 146 or an interference target 148. The target category 144 can be an identification of the specific signal component sought and handled for a specific iteration or session.

The serving target 146 can be the identification of the serving signal 112 sought and handled for the specific iteration or session. The interference target 148 can be the identification of the interference signal 120 sought and handled for the specific iteration or session.

The computing system 100 can use mutual information 150, coding gain 152, a selection profile 154, or a combination thereof to generate the decoding target as the serving target 146 or the interference target 148. The mutual information 150 is a measure of mutual dependence between two parameters.

The mutual information 150 can be the measure of mutual dependence between processing results associated with the serving signal 112 and the interference signal 120, the serving channel estimate 118, the interference channel estimate 124, or a combination thereof. For example, the mutual information 150 can be based on a-priori information or extrinsic information corresponding to the serving signal 112 and the interference signal 120.

The coding gain 152 is a measure of improvement or change resulting from decoding a signal. The coding gain 152 can be the measure for processing and decoding the receiver signal 116 for the serving content 108. The coding gain 152 can include a measure in a difference between signal-to-noise ratio (SNR) levels between un-coded system and coded system, or between iterations or sessions of processing or decoding of the signal.

The coding gain 152 can include a serving gain 156, an interference gain 158, or a combination thereof. The serving gain 156 can include the coding gain 152 associated with the serving signal 112. The serving gain 156 can be based on processing or decoding for the serving signal 112. The interference gain 158 can include the coding gain 152 associated with the interference signal 120. The interference gain 158 can be based on processing or decoding for the interference signal 120.

The selection profile 154 is a process, a method, a rule, or a combination thereof controlling the selection and generation of the target category 144 for the decoding target 142. The selection profile 154 can dynamically control the decoding target 142 based on conditions or circumstances surrounding the receiver signal 116. The selection profile 154 can include an initial selection 160, a final selection 162, a switch criterion 164, or a combination thereof.

The initial selection 160 is a selection, a method or a process of selecting, or a combination thereof for the decoding target 142 for first iteration. The initial selection 160 can include a static value or a mechanism for generating the decoding target 142 for the first processing iteration.

The final selection 162 is a selection, a method or a process of selecting, or a combination thereof for the decoding target 142 for last iteration. The final selection 162 can include a static value or a mechanism for generating the decoding target 142 for the last processing iteration.

The switch criterion 164 is a rule, a process, a method, a condition, or a combination thereof controlling selection of the decoding target 142 between the first iteration and the last iteration. The switch criterion 164 can include static value, a process or a condition for calculating thresholds or indications, or a combination thereof between the initial selection 160 and the final selection 162.

For illustrative purposes, the first device 102 is described as receiving and processing the receiver signal 116 corresponding to the serving signal 112 from the second device 106. However, it is understood that the computing system 100 can include the second device 106 receiving and processing the receiver signal 116 corresponding to the serving signal 112 from the first device 102.

Figure 2:
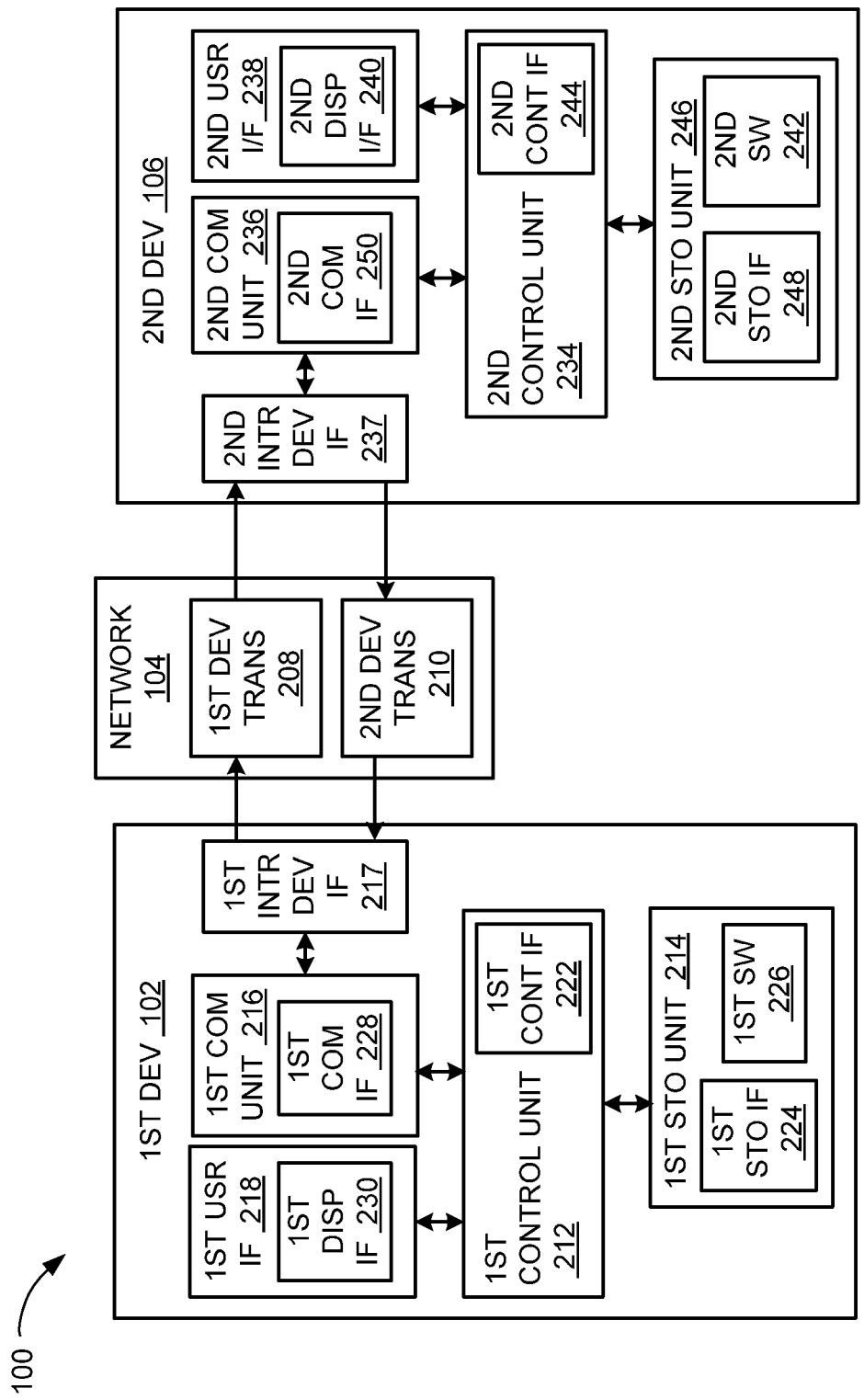
FIG. 2 is an exemplary block diagram of the computing system.

Referring now to FIG. 2, therein is shown an exemplary block diagram of the computing system 100. The computing system 100 can include the first device 102, the network 104, and the second device 106. The first device 102 can send information in a first device transmission 208 over the network 104 to the second device 106. The second device 106 can send information in a second device transmission 210 over the network 104 to the first device 102.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 212, a first storage unit 214, a first communication unit 216, and a first user interface 218. The first control unit 212 can include a first control interface 222. The first control unit 212 can execute a first software 226 to provide the intelligence of the computing system 100.

The first control unit 212 can be implemented in a number of different manners. For example, the first control unit 212 can be a processor, an application specific integrated circuit (ASIC) an embedded processor, a microprocessor, a hardware control logic, a hardware finite state machine (FSM), a digital signal processor (DSP), or a combination thereof. The first control interface 222 can be used for communication between the first control unit 212 and other functional units in the first device 102. The first control interface 222 can also be used for communication that is external to the first device 102.

The first control interface 222 can receive information from the other functional units or from external sources, or can transmit information to the other functional units or to external destinations. The external sources and the external destinations refer to sources and destinations external to the first device 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage unit 214 can store the first software 226. The first storage unit 214 can also store the relevant information, such as data representing incoming images, data representing previously presented image, sound files, or a combination thereof.

The first storage unit 214 can be a volatile memory, a nonvolatile memory, an internal memory, an external memory, or a combination thereof. For example, the first storage unit 214 can be a nonvolatile storage such as nonvolatile random access memory (NVRAM), Flash memory, disk storage, or a volatile storage such as static random access memory (SRAM).

The first storage unit 214 can include a first storage interface 224. The first storage interface 224 can be used for communication between the first storage unit 214 and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first device 102. For example, the first communication unit 216 can permit the first device 102 to communicate with the second device 106, a different device, an attachment, such as a peripheral device or a desktop computer, the network 104, or a combination thereof.

The first communication unit 216 can also function as a communication hub allowing the first device 102 to function as part of the network 104 and not limited to be an end point or terminal unit to the network 104. The first communication unit 216 can include active and passive components, such as microelectronics or an antenna, for interaction with the network 104.

The first communication unit 216 can include a baseband device or component, a modem, a digital signal processor, or a combination thereof for transmitting, formatting, receiving, detecting, decoding, further processing, or a combination thereof for communication signals. The first communication unit 216 can include one or more portions for processing the voltages, the currents, the digital information, or a combination thereof, such as an analog-to-digital converter, a digital-to-analog converter, a filter, an amplifier, a processor-type circuitry, or a combination thereof. The first communication unit 216 can further include one or more portions for storing information, such as cache or RAM memory, registers, or a combination thereof.

The first communication unit 216 can be coupled with a first inter-device interface 217. The first inter-device interface 217 can be a device or a portion of a device for physically communicating signals with a separate device. The first inter-device interface 217 can communicate by transmitting or receiving signals to or from another device. The first inter-device interface 217 can include one or more antennas for wireless signals, a physical connection and receiver-transmitter for wired signals, or a combination thereof. The first inter-device interface 217 can include an omnidirectional antenna, a wire, an antenna chip, a ceramic antenna, or a combination thereof. The first inter-device interface 217 can further include a port, a wire, a repeater, a connector, a filter, a sensor, or a combination thereof.

The first inter-device interface 217 can detect or respond to a power in electromagnetic waves and provide the detected result to the first communication unit 216 to receive a signal, including the second device transmission 210. The first inter-device interface 217 can provide a path or respond to currents or voltages provided by the first communication unit 216 to transmit a signal, including the first device transmission 208.

The first communication unit 216 can include a first communication interface 228. The first communication interface 228 can be used for communication between the first communication unit 216 and other functional units in the first device 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first device 102. The first user interface 218 can include an input device and an output device. Examples of the input device of the first user interface 218 can include a keypad, a touchpad, soft-keys, a keyboard, a microphone, an infrared sensor for receiving remote signals, or any combination thereof to provide data and communication inputs.

The first user interface 218 can include a first display interface 230. The first display interface 230 can include an output device. The first display interface 230 can include a display, a projector, a video screen, a speaker, or any combination thereof.

The first control unit 212 can operate the first user interface 218 to display information generated by the computing system 100. The first control unit 212 can also execute the first software 226 for the other functions of the computing system 100. The first control unit 212 can further execute the first software 226 for interaction with the network 104 via the first communication unit 216.

The second device 106 can be optimized for implementing an embodiment of the present invention in a multiple device embodiment with the first device 102. The second device 106 can provide the additional or higher performance processing power compared to the first device 102. The second device 106 can include a second control unit 234, a second communication unit 236, a second user interface 238, and a second storage unit 246.

The second user interface 238 allows a user (not shown) to interface and interact with the second device 106. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second device 106 of the computing system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the computing system 100, including operating the second communication unit 236 to communicate with the first device 102 over the network 104.

The second control unit 234 can be implemented in a number of different manners. For example, the second control unit 234 can be a processor, an embedded processor, a microprocessor, hardware control logic, a hardware finite state machine (FSM), a digital signal processor (DSP), or a combination thereof.

The second control unit 234 can include a second control interface 244. The second control interface 244 can be used for communication between the second control unit 234 and other functional units in the second device 106. The second control interface 244 can also be used for communication that is external to the second device 106.

The second control interface 244 can receive information from the other functional units or from external sources, or can transmit information to the other functional units or to external destinations. The external sources and the external destinations refer to sources and destinations external to the second device 106.

The second control interface 244 can be implemented in different ways and can include different implementations depending on which functional units or external units are being interfaced with the second control interface 244. For example, the second control interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the information such as data representing incoming images, data representing previously presented image, sound files, or a combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the computing system 100 is shown with the second storage unit 246 as a single hierarchy storage system, although it is understood that the computing system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between the second storage unit 246 and other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second control interface 244.

The second communication unit 236 can enable external communication to and from the second device 106. For example, the second communication unit 236 can permit the second device 106 to communicate with the first device 102 over the network 104.

The second communication unit 236 can also function as a communication hub allowing the second device 106 to function as part of the network 104 and not limited to be an end point or terminal unit to the network 104. The second communication unit 236 can include active and passive components, such as microelectronics or resistors, for interaction with the network 104.

The second communication unit 236 can include a baseband device or component, a modem, a digital signal processor, or a combination thereof for transmitting, formatting, receiving, detecting, decoding, further processing, or a combination thereof for communication signals. The second communication unit 236 can include one or more portions for processing the voltages, the currents, the digital information, or a combination thereof, such as an analog-to-digital converter, a digital-to-analog converter, a filter, an amplifier, a processor-type circuitry, or a combination thereof. The second communication unit 236 can further include one or more portions for storing information, such as cache or RAM memory, registers, or a combination thereof.

The second communication unit 236 can be coupled with a second inter-device interface 237. The second inter-device interface 237 can be a device or a portion of a device for physically communicating signals with a separate device. The second inter-device interface 237 can communicate by transmitting or receiving signals to or from another device. The second inter-device interface 237 can include one or more antennas for wireless signals, a physical connection and receiver-transmitter for wired signals, or a combination thereof. The second inter-device interface 237 can include an omnidirectional antenna, a wire, an antenna chip, a ceramic antenna, or a combination thereof. The second inter-device interface 237 can further include a port, a wire, a repeater, a connector, a filter, a sensor, or a combination thereof.

The second inter-device interface 237 can detect or respond to a power in electromagnetic waves and provide the detected result to the second communication unit 236 to receive a signal, including the first device transmission 208. The second inter-device interface 237 can provide a path or respond to currents or voltages provided by the second communication unit 236 to transmit a signal, including the second device transmission 210.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second control interface 244.

The first communication unit 216 can couple with the network 104 to send information to the second device 106 in the first device transmission 208. The second device 106 can receive information in the second communication unit 236 from the first device transmission 208 of the network 104.

The second communication unit 236 can couple with the network 104 to send information to the first device 102 in the second device transmission 210. The first device 102 can receive information in the first communication unit 216 from the second device transmission 210 of the network 104. The computing system 100 can be executed by the first control unit 212, the second control unit 234, or a combination thereof. For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. Also, the second device 106 can include other functional units not shown in FIG. 2 for clarity.

The functional units in the first device 102 can work individually and independently of the other functional units. The first device 102 can work individually and independently from the second device 106 and the network 104.

The functional units in the second device 106 can work individually and independently of the other functional units. The second device 106 can work individually and independently from the first device 102 and the network 104.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the computing system 100 is described by operation of the first device 102 and the second device 106. It is understood that the first device 102 and the second device 106 can operate any of the modules and functions of the computing system 100.

Figure 3:
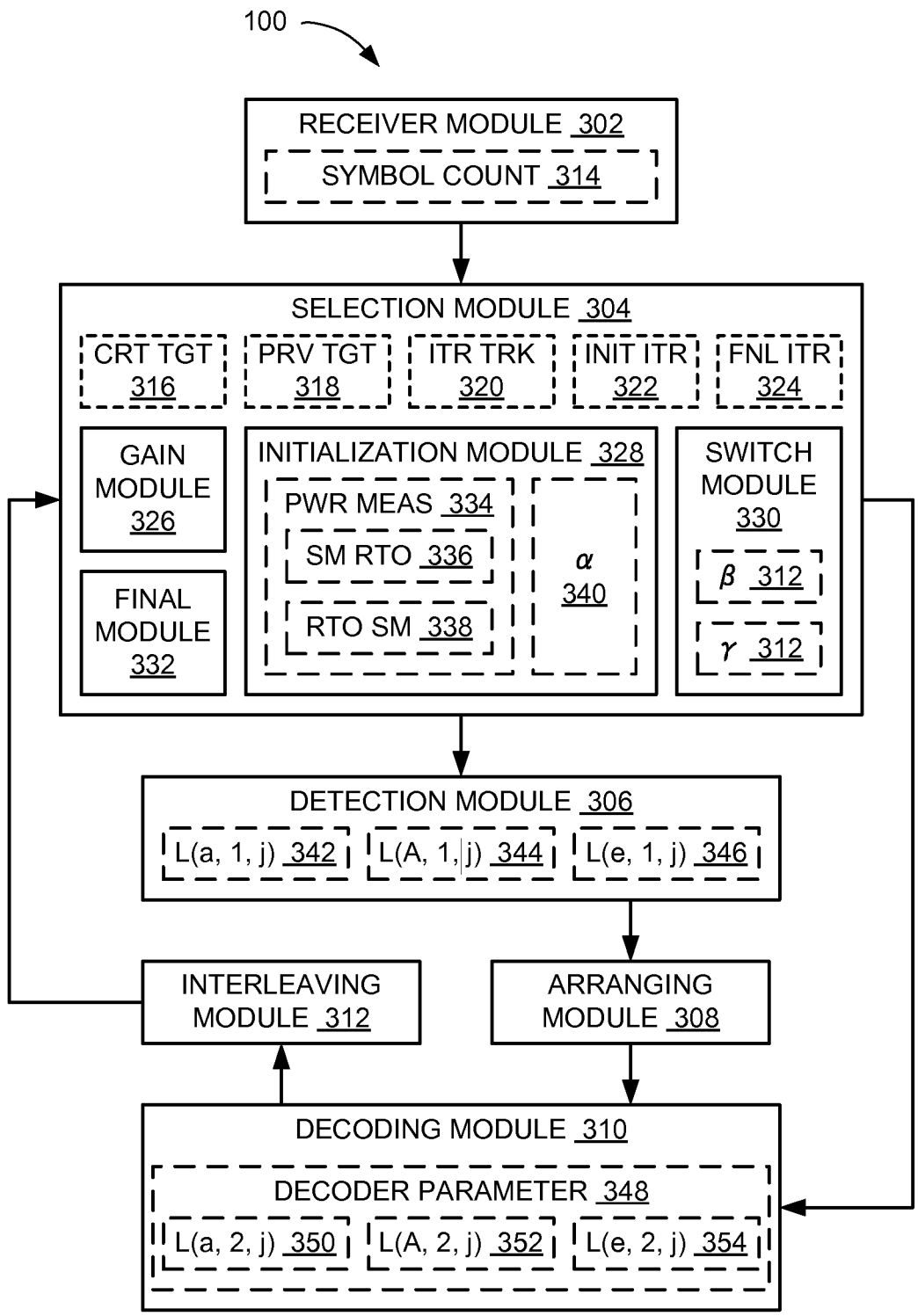
FIG. 3 is a control flow of the computing system.

Referring now to FIG. 3, therein is shown a control flow of the computing system 100. The computing system 100 can include a receiver module 302, a selection module 304, a detection module 306, an arranging module 308, a decoding module 310, an interleaving module 312, or a combination thereof.

The receiver module 302 can be coupled with the selection module 304. The selection module 304 can be coupled with the interleaving module 312, the detection module 306, the decoding module 310, or a combination thereof. The detection module 306 can be coupled with the arranging module 308, which can be further coupled with the decoding module 310. The decoding module 310 can be coupled with interleaving module 312.

The modules can be coupled to each other in a variety of ways. For example, modules can be coupled by having the input of one module connected to the output of another, such as by using wired or wireless connections, the network 104 of FIG. 1, instructional steps, process sequence, or a combination thereof. Also for example, the modules can be coupled either directly with no intervening structure other than connection means between the directly coupled modules, or indirectly with modules or devices other than the connection means between the indirectly coupled modules.

As a more specific example, one or more inputs or outputs of the selection module 304 can be directly connected to one or more inputs or outputs of the receiver module 302, the interleaving module 312, the detection module 306, the decoding module 310, or a combination thereof using conductors or the transmission channel without intervening modules or devices there-between. Also as a more specific example, the selection module 304 can be coupled with the receiver module 302, the interleaving module 312, the detection module 306, the decoding module 310, or a combination thereof indirectly using a repeater, a switch, a routing device, or a combination thereof there-between. The receiver module 302, the arranging module 308, the decoding module 310, the interleaving module 312, or a combination thereof can be coupled directly or indirectly in similar ways.

The computing system 100 can communicate with or using a device, such as by displaying images, recreating sounds, exchanging process steps or instructions, or a combination thereof. The computing system 100 can communicate information between devices. The receiving device can further communicate with the user by displaying images, recreating sounds, exchanging process steps or instructions, or a combination thereof according to the information communicate to the device.

The selection module 304, the detection module 306, the arranging module 308, the decoding module 310, the interleaving module 312, or a combination thereof can be for implementing the receiver processing mechanism 132 of FIG. 1, the iterative detection-decoding mechanism 134 of FIG. 1, or a combination thereof. The selection module 304, the detection module 306, the arranging module 308, the decoding module 310, the interleaving module 312, or a combination thereof can further include interference-aware receiver 136 of FIG. 1, the multiple stream receiver 138 of FIG. 1, the turbo receiver 140 of FIG. 1, or a combination thereof. The first device 102 of FIG. 1, the second device 106 of FIG. 1, or a combination thereof can include the device profile describing the selection module 304, the detection module 306, the arranging module 308, the decoding module 310, the interleaving module 312, or a combination thereof as predetermined or detected by the computing system 100.

The receiver module 302 is configured to receive the receiver signal 116 of FIG. 1. The receiver module 302 can receive the receiver signal 116 corresponding to and representing the serving signal 112 of FIG. 1, the interference signal 120 of FIG. 1, or a combination thereof.

The receiver module 302 can receive the receiver signal 116 as the serving signal 112, the interference signal 120, or a combination thereof having respectively traversed the serving channel, the additional channel, or a combination thereof. The receiver module 302 can receive the receiver signal 116 including symbols corresponding to and representing one or more instances of the code word 110 of FIG. 1. The receiver module 302 can receive the receiver signal 116 including symbols corresponding to and representing the code word 110 associated with the serving signal 112, the interference signal 120, or a combination thereof.

The receiver module 302 can receive the receiver signal 116 by recording electrical power, voltage, current, or a combination thereof. For example, the receiver module 302 can receive the receiver signal 116 by recording energy levels or changes therein for the first inter-device interface 217 of FIG. 2, the second inter-device interface 237 of FIG. 2, the first communication interface 228 of FIG. 2, the second communication interface 250 of FIG. 2, the first control interface 222 of FIG. 2, the second control interface 244 of FIG. 2, or a combination thereof.

Also for example, the receiver module 302 can receive the receiver signal 116 by recording energy levels or changes received through a wireless antenna, a wire or a conductor, an instruction or a step for transferring data between devices, processes, instructions, between portions therein, or a combination thereof. Also for example, the receiver module 302 can record the receiver signal 116 by storing the energy levels or changes therein, according to a time, a sequence, or a combination thereof in the first communication unit 216 of FIG. 2, the second communication unit 236 of FIG. 2, the first storage unit 214 of FIG. 2, the second storage unit 246 of FIG. 2, or a combination thereof.

The receiver module 302 can process the receiver signal 116 to determine aspects thereof. For example, the receiver module 302 can determine a sample size, a sample index, the reference portion 114 of FIG. 1 for the serving signal 112 or the interference signal 120, the noise portion 130 of FIG. 1, or a combination thereof. The receiver module 302 can recognize based on a method or a process predetermined by the computing system 100 or a standard for controlling a sampling rate, a block size, a symbol size, or a combination thereof.

As a more specific example, the receiver module 302 can determine a symbol count 314. The symbol count 314 is a total number or a quantity of symbols representing or associated with the code word 110. The symbol count 314 can represent a total number of resource elements in the code word 110.

The receiver signal 116 can be represented using the symbol count 314 as:

$$y_k = H_{Dk} x_{Dk} + H_{Ik} x_{Ik} + n_k, \forall_k = 1 \ldots K.$$ Equation (2).

The receiver signal 116 can be represented as '$y_k$'. The serving channel estimate 118 of FIG. 1, including the effective channel gain and transmitter power, can be represented as '$H_{Dk}$' and the serving signal 112 can be represented as '$x_{Dk}$'. The interference channel estimate 124 of FIG. 1, including the effective channel gain and transmitter power, can be represented as '$H_{Ik}$' and the interference signal 120 can be represented as '$x_{Ik}$'. The term 'k' can represent an index or a specific instance of the signal, such as for a symbol. The term 'K' can represent the symbol count 314.

The receiver module 302 can further use a dedicated device, circuitry, process, or a combination thereof to determine the aspects of the receiver signal 116 including the noise measure. The receiver module 302 can also use known parts or aspects of the receiver signal 116 to further identify appropriate instance of the values for other aspects as predetermined and stored by the computing system 100. The receiver module 302 can further determine the noise measure using a statistical analysis based on the noise portion 130, based on values predetermined by the computing system 100, or a combination thereof.

The receiver module 302 can determine the aspects of the receiver signal 116 using the first communication unit 216, the second communication unit 236, the first control unit 212 of FIG. 2, the second control unit 234 of FIG. 2, or a combination thereof. The receiver module 302 can store the aspects of the receiver signal 116 in the first communication unit 216, the second communication unit 236, the first storage unit 214, the second storage unit 246, or a combination thereof.

The receiver module 302 can further characterize communication channels. For example, the receiver module 302 can calculate the serving channel estimate 118, the interference channel estimate 124, or a combination thereof.

The receiver module 302 can use the reference portion 114 associated with the serving signal 112, the interference signal 120, a portion in the receiver signal 116 corresponding thereto, or a combination thereof to calculate the serving channel estimate 118, the interference channel estimate 124, or a combination thereof. The details, formats, requirements, or a combination thereof regarding the reference portion 114, such as regarding original frequency, phase, content, shape, or a combination thereof, can be predetermined by the communication standard, the computing system 100, or a combination thereof.

The receiver module 302 can compare the received instances of the receiver signal 116 or segments therein to the predetermined parameters for the reference portion 114. The receiver module 302 can further use frequency domain transformation or time domain transformation, convolution, transposition, basic mathematical operations, or a combination thereof with the predetermined or received instances of the reference communication, or both.

The receiver module 302 can further calculate the changes in magnitude, frequency, phase, or a combination thereof in the reference portion in the serving signal 112, the interference signal 120, or a combination thereof to the receiver signal 116. The receiver module 302 can further use various methods, such as the least square method, the least mean square (LMS) method, or the minimum mean square error (MMSE) method, to calculate the serving channel estimate 118, the interference channel estimate 124, or a combination thereof.

The receiver module 302 can use the first communication unit 216, the second communication unit 236, the first control unit 212, the second control unit 234, or a combination thereof to calculate the serving channel estimate 118, the interference channel estimate 124, or a combination thereof. The receiver module 302 can store the serving channel estimate 118, the interference channel estimate 124, or a combination thereof in the first communication unit 216, the second communication unit 236, the first storage unit 214, the second storage unit 246, or a combination thereof.

After receiving the receiver signal 116 and determining the aspects thereof, the control flow can pass to the selection module 304. The control flow can pass through a variety of ways. For example, control flow can pass by having processing results of one module passed to another module, such as by passing the receiver signal 116, the determined aspects thereof, or a combination thereof from the receiver module 302 to the selection module 304, by storing the processing results at a location known and accessible to the other module, such as by storing the receiver signal 116, the determined aspects thereof, or a combination thereof at a storage location known and accessible to the selection module 304, by notifying the other module, such as by using a flag, an interrupt, a status signal, or a combination for the selection module 304, or a combination of processes thereof.

The selection module 304 is configured to control an order or a sequence for decoding process. The selection module 304 can control a target for the decoding process at the decoding module 310. The selection module 304 can control the target for the decoding module 310, such as decoding for the serving signal 112 or the interference signal 120, by generating the decoding target 142 of FIG. 1.

The selection module 304 can generate the decoding target 142 as the serving target 146 of FIG. 1 or the interference target 148 of FIG. 1. The selection module 304 can generate the decoding target 142 including a current target 316 as the serving target 146 or the interference target 148. The selection module 304 can generate the current target 316 based on a previous target 318.

The current target 316 is a representation of the signal component sought and handled during a current iteration or session. The previous target 318 is a representation of the signal component sought and handled during a preceding or a previous iteration or session.

The selection module 304 can generate the current target 316 for controlling the decoding process corresponding to an iteration tracker 320 having same value for the instant iteration. The iteration tracker 320 can include an index representing a specific instance of the iteration or processing session. The selection module 304 can generate the current target 316 same as or different from the previous target 318 corresponding a value of the iteration tracker 320 occurring prior to the current instance, including the immediately preceding instance of the iteration or the session.

The selection module 304 can dynamically generate the decoding target 142 for decoding of the receiver signal 116. The selection module 304 can dynamically generate the decoding target 142 instead of a fixed decoding sequence of the serving target 146 and the interference target 148 determined prior to receiving the receiver signal 116. The selection module 304 can dynamically generate the decoding target 142 based on characteristics or traits of the receiver signal 116, channel estimations, processing results, or a combination thereof corresponding to a current instance of communication.

It has been discovered that dynamically generating the decoding target 142 as either the serving target 146 or the interference target 148 provides increased communication rate. The decoding target 142 can be adjusted dynamically according to the condition or the situation relevant to the receiver signal 116 based on the process described above. The dynamically generated instance of the decoding target 142 can decode for the serving signal 112 or the interference signal 120 that would yield the most optimal result.

The selection module 304 can generate the decoding target 142 including the current target 316 for an initial iteration 322, a final iteration 324, an iteration there-between, or a combination thereof. The initial iteration 322 can be the first instance of the iteration, including a value of 0 or 1, for processing the receiver signal 116, the serving content 108 of FIG. 1, the code word 110, a symbol, or a combination thereof. The selection module 304 can include the final iteration 324 associated with processing the receiver signal 116, the serving content 108, the code word 110, the symbol, or the combination thereof as predetermined by the computing system 100, a communication standard, a coding routine, or a combination thereof.

The selection module 304 can implement and utilize the selection profile 154 of FIG. 1 to generate the decoding target 142. The selection module 304 can include a gain module 326, an initialization module 328, a switch module 330, a final module 332, or a combination thereof.

The gain module 326 is configured to determine an estimated decoding gain. The gain module 326 can determine based on calculating the coding gain 152 of FIG. 1, including the serving gain 156 of FIG. 1, the interference gain 158 of FIG. 1, or a combination thereof based on the receiver signal 116.

The gain module 326 can calculate the coding gain 152 based on the modulation-coding scheme corresponding to the serving signal 112, the interference signal 120, or a combination thereof. For example, the gain module 326 can calculate the coding gain 152 based on the serving scheme 126 of FIG. 1, the interference scheme 128 of FIG. 1, or a combination thereof.

The gain module 326 can use the serving scheme 126, the interference scheme 128, or a combination thereof based on the receiver signal 116 as determined by the receiver module 302. For example, the receiver module 302 can determine the serving scheme 126 for representing the serving signal 112, the interference scheme 128 for representing the interference signal 120, or a combination thereof using a control information, such as including in a header or communicated using a separate physical layer or control communication layer.

Also for example, the receiver module 302 can determine the serving scheme 126, the interference scheme 128, or a combination thereof through the channel estimation process. The serving channel estimate 118 can include the serving scheme 126, the interference channel estimate 124 can include the interference scheme 128, or a combination thereof.

The gain module 326 can use the serving scheme 126, the interference scheme 128, or a combination thereof to further calculate the coding gain 152. The gain module 326 can calculate the coding gain 152, which can be a basis for generating the decoding target 142, based on the serving scheme 126, the interference scheme 128, or a combination thereof.

For example, the gain module 326 can include a lookup table, an equation, a process or a method, or a combination thereof for utilizing the serving scheme 126, the interference scheme 128, or a combination thereof as input information to calculate the coding gain 152 as output. For a more specific example, the gain module 326 can use the serving scheme 126 and the interference scheme 128 as input information for the lookup table and calculate the serving gain 156 and the interference gain 158 associated thereto.

The gain module 326 can include the lookup table, the equation, the process or the method, or the combination thereof in the first communication unit 216, the second communication unit 236, the first storage unit 214, the second storage unit 246, or a combination thereof. The gain module 326 can use the first communication interface 228, the second communication interface 250, the first control interface 222, the second control interface 244, the first storage interface 224 of FIG. 2, the second storage interface 248 of FIG. 2, or a combination thereof to access the information for calculating the coding gain 152. The gain module 326 can use the first communication unit 216, the second communication unit 236, the first control unit 212, the second control unit 234, or a combination thereof to calculate the coding gain 152.

The selection module 304 can generate the decoding target 142 by selection between the serving target 146 and the interference target 148 based on the coding gain 152 for decoding the receiver signal 116 for the serving signal 112 with the serving target 146 or for the interference signal 120 with the interference target 148. The selection module 304 can utilize the initialization module 328, the switch module 330, or a combination thereof for generating the decoding target 142 based on the coding gain 152.

The initialization module 328 can correspond to the initial iteration 322. The final module 332 can correspond to the final iteration 324. The switch module 330 can correspond to the iteration tracker 320 between the initial iteration 322 and the final iteration 324.

The selection module 304 can initialize, increment, test, or a combination thereof for the iteration tracker 320. The selection module 304 can utilize the initialization module 328, the switch module 330, the final module 332, or a combination thereof based on the iteration tracker 320.

The initialization module 328 is configured to generate the decoding target 142 corresponding to the initial iteration 322. The initialization module 328 can dynamically generate the decoding target 142. The initialization module 328 can implement or utilize the initial selection 160 of FIG. 1 for the selection profile 154.

The initialization module 328 can generate the decoding target 142 by calculating a power measurement 334 according to the initial selection 160. The initialization module 328 can calculate the power measurement 334 for the receiver signal 116, corresponding to the serving signal 112 and the interference signal 120 therein, for the initial iteration 322 for decoding the receiver signal 116.

The power measurement 334 is a characteristic or a trait corresponding to energy associated with both the serving signal 112 and the interference signal 120 reflected in the receiver signal 116. The power measurement 334 can be a representation of the signal power corresponding to the serving signal 112 and the interference signal 120.

The power measurement 334 can further include a comparison of the signal power corresponding to the serving signal 112 and the interference signal 120. The power measurement 334 can include a comparison of total power associated with the serving signal 112 and total power associated with the interference signal 120 included in the receiver signal 116.

For example, the power measurement 334 can be based on a sum-ratio 336 or a ratio-sum 338. The sum-ratio 336 can include a sum of power ratios between the serving signal 112 and the interference signal 120. The ratio-sum 338 can include a ratio of sum of power values for the serving signal 112 and sum of power values for the interference signal 120. The power measurement 334 can further be based the coding gain 152, the channel estimation, or a combination thereof.

As a more specific example, the power measurement 334 based on the sum-ratio 336 can be based on:

$$P_{th} = \frac{1}{N} \sum_i \frac{\|H_{D_i}\|^2 / G_D}{\|H_{I_i}\|^2 / G_I}. \quad \text{Equation (3)}$$

The power measurement 334 can be represented as '$P_{th}$'. The term 'N' can represent a size associated with the receiver signal 116, such as a total number of code words, the symbol count 314, number of samples, or a combination thereof. The serving gain 156 can be represented as '$G_D$' and the interference gain 158 can be represented as '$G_I$'.

The initialization module 328 can compare the power measurement 334 to a serving-noise comparison threshold 340 of the initial selection 160 for generating the decoding target 142. The serving-noise comparison threshold 340 can include a threshold value for controlling a selection between the serving target 146 and the interference target 148 as the decoding target 142. The serving-noise comparison threshold 340 can be represented as 'α'.

For example, the serving-noise comparison threshold 340 can be for determining the serving signal 112 or the interference signal 120 having higher signal power within the receiver signal 116. Also for example, the serving-noise comparison threshold 340 can be an arbitrary value predetermined by the computing system 100. As a more specific example, the serving-noise comparison threshold 340 can be 1 or 0.

The initialization module 328 can generate the decoding target 142 for the initial iteration 322 according to the initial selection 160. The initialization module 328 can generate the decoding target 142 for decoding the receiver signal 116 for greater of the serving signal 112 or the interference signal 120. The initialization module 328 can generate the decoding target 142 for decoding for the serving signal 112 or the interference signal 120 having greater instance of the signal power according to the initial selection 160 using the power measurement 334 and the serving-noise comparison threshold 340.

For example, the initialization module 328 can determine that the serving signal 112 has greater signal power than the interference signal 120 in the receiver signal 116 when the power measurement 334 is greater than the serving-noise comparison threshold 340 according to the initial selection 160. The initialization module 328 can generate the current target 316 for the initial iteration 322 as the serving target 146 when the power measurement 334 is greater than the serving-noise comparison threshold 340.

Also for example, the initialization module 328 can determine the interference signal 120 has greater signal power than the serving signal 112 in the receiver signal 116 when the power measurement 334 is less than or equal to the serving-noise comparison threshold 340 according to the initial selection 160. The initialization module 328 can generate the current target 316 for the initial iteration 322 as the interference target 148 when the power measurement 334 is less than or equal to the serving-noise comparison threshold 340.

For illustrative purposes, the power measurement 334 has been described as utilizing the sum-ratio 336. However, it is understood that the power measurement 334 can be implemented in a variety of ways. For example, initialization module 328 can generate the decoding target based on the power measurement 334 including the ratio-sum 338, the sum-ratio 336, or specific power measurements corresponding to the interference signal 120 and the serving signal 112 for representing the serving signal 112, the interference signal 120, or a combination thereof corresponding to the receiver signal 116. Also for example, the power measurement 334 can be based on signal-to-interference ratio (SIR).

Also for illustrative purposes, the initialization module 328 has been described as utilizing the power measurement 334 compared to the serving-noise comparison threshold 340. However, it is understood that the initialization module 328 can utilize other methods. For example, the initialization module 328 can compare the specific power measurements corresponding to the interference signal 120 and the serving signal 112 or take the difference thereof and compare to 0.

It has been discovered that generating the decoding target 142 for the initial iteration 322 using the power measurement 334 and the serving-noise comparison threshold 340 provides improved communication rate. The initial selection 160 utilizing the power measurement 334 and the serving-noise comparison threshold 340 can utilize the modulation-coding scheme and the coding gain 152 to generate the decoding target 142 for decoding the stronger of the receiver signal 116 and the interference signal 120, leading to more accurate processing results. The accurate processing results can reduce the total number of iterations, errors, and retransmissions, leading to the improved communication rate.

The initialization module 328 can use the first communication unit 216, the second communication unit 236, the first control unit 212, the second control unit 234, or a combination thereof to generate the decoding target 142 for the initial iteration 322. The initialization module 328 can store the decoding target 142 or a processing result thereof in the first communication unit 216, the second communication unit 236, the first storage unit 214, the second storage unit 246, or a combination thereof.

The final module 332 is configured to generate the decoding target 142 corresponding to the final iteration 324. The final module 332 can use the final selection 162 of FIG. 1 to generate the current target 316 for the final iteration 324. The final module 332 can use the final selection 162 to generate the current target 316 as the serving target 146. The final module 332 can generate the current target 316 as the serving target 146 for decoding for the serving signal 112 or the serving content 108 in the receiver signal 116 on the final iteration 324.

The final selection 162 can be predetermined by the computing system 100 as the serving target 146. The final module 332 can generate the decoding target 142 as the serving target 146 for the final iteration 324 since the serving signal 112 and the serving content 108 therein was intended for the receiving device, such as the first device 102, and not the interference signal 120.

The switch module 330 is configured to generate the decoding target 142 for iterations between the initial iteration 322 and the final iteration 324. The switch module 330 will be described in detail below.

After generating the decoding target 142, the control flow can be passed from the selection module 304 to the detection module 306, the decoding module 310, or a combination thereof. The control flow can pass similarly as described above between the receiver module 302 and the selection module 304 but using processing results of the selection module 304, such as the decoding target 142 or processing result thereof, such as the coding gain 152 or the modulation-coding scheme.

The detection module 306 is configured to recognize contents of the receiver signal 116. The detection module 306 can detect symbol level information, the code word 110, bit level information, or a combination thereof in the receiver signal 116. The detection module 306 can detect information in the receiver signal 116 corresponding to the serving signal 112, the interference signal 120, or a combination thereof.

The detection module 306 can include the interference aware detector for recognizing and processing both serving data and interference data. The detection module 306 can further include the point-to-point detector or the MIMO detector. The detection module 306 can implement a turbo principle mechanism, such as for the turbo receiver 140. The detection module 306 can further include a joint detector for detecting both serving signal and interference signal.

The detection module 306 can detect the receiver signal 116 based on a detector a-priori data 342. The detector a-priori data 342 can be a prior knowledge for the detection module 306 about the serving content 108, the serving signal 112, the interference signal 120, the code word 110, the receiver signal 116, previous processing result, a symbol therein, a bit therein, or a combination thereof.

The detector a-priori data 342 can be one or more measures of confidence levels associated with a likely transmitted symbol or likelihoods for all possible symbols, or the associated bit values, corresponding to the analyzed portion in the receiver signal 116. The detector a-priori data 342 can be a log likelihood ratio (LLR).

The detector a-priori data 342 can be based on:

$$L_{n,m}^{(a,1,t)} = \log \frac{P(b_{n,m}^k = +1)}{P(b_{n,m}^k = -1)}. \qquad \text{Equation (4)}$$

The detector a-priori data 342 can be expressed as '$L_{n,m}^{(a,1,1)}$'. The detector a-priori data 342 can correspond to 'n'th symbol and the 'm'th bit at an instance of the code word 110. The notation 'a' in the superscript can represent a-priori value. The '1' in the superscript can represent the detection module 306. The term 't' in the superscript can represent processing of the serving signal 112 or the interference signal 120 or the content therein for the interference-aware receiver 136. The detector a-priori data 342 can be a logarithmic result of a ratio between a probability that a certain bit or symbol within the receiver signal 116 had a transmitted value of +1 and a different probability that the same bit or symbol had a transmitted value of −1 or 0.

The detection module 306 can determine a value resulting from a module external to the detection module 306, such as the decoding module 310, the interleaving module 312, the selection module 304, or a combination thereof as the detector a-priori data 342. The detection module 306 can also determine a value resulting from a previous iteration in determining the serving content 108 as the detector a-priori data 342.

For an initial iteration, the detection module 306 can use an initial value for the detector a-priori data 342. For example, the detection module 306 can initialize the detector a-priori data 342 as 0, 1, NULL, a value predetermined by the computing system 100, externally supplied value, or a combination thereof.

The detection module 306 can detect the receiver signal 116 by calculating a detector a-posteriori data 344. The detector a-posteriori data 344 can be a later knowledge for the detection module 306 about the serving content 108, the serving signal 112, the interference signal 120, the code word 110, the receiver signal 116, a symbol therein, a bit therein, or a combination thereof. The detector a-posteriori data 344 can be one or more measures of confidence levels associated with a likely transmitted symbol or likelihoods for all possible symbols, or the associated bit values, corresponding to an analyzed portion in the receiver signal 116. The detector a-posteriori data 344 can be a LLR.

The detection module 306 can calculate the detector a-posteriori data 344 according to:

$$L_{n,m}^{(A,1,t)} = \log \frac{P(b_{n,m}^1 = +1 \mid y)}{P(b_{n,m}^1 = -1 \mid y)}. \qquad \text{Equation (5)}$$

The detector a-posteriori data 344 can be a logarithmic result of a ratio between a probability that a certain bit or symbol within the receiver signal 116 had a transmitted value of +1 given the receiver signal 116 and a different probability that the same bit or symbol had a transmitted value of −1 or 0 given the receiver signal 116.

The detection module 306 can further calculate and approximate the detector a-posteriori data 344 based on:

$$L_{n,m}^{(A,1,t)} = \log \frac{P\left(\frac{1}{2}b^1 L_n^{(a,1,1)} + \frac{1}{2}b^2 L_n^{(a,1,2)}\right)}{\sum_{b^1 \in \{b_{n,j}^1 = -1\}, b^2} P(y \mid b^1 b^2)} \approx \qquad \text{Equation (6)}$$

$$P\left(\frac{1}{2}b^1 L_n^{(a,1,1)} + \frac{1}{2}b^2 L_n^{(a,1,2)}\right)$$

$$\max_{\bar{\theta} \in \{b_{n,j}^1 = +1\}, b^2} \left( -\frac{1}{\sigma_n^2} \|y - \sqrt{P_1} H^1 \bar{\theta}^1 + \sqrt{P_2} H^2 x^2\| + \frac{1}{2} b^1 L_n^{(a,1,1)} + \frac{1}{2} b^2 L_n^{(a,1,2)} \right) -$$

$$\max_{\bar{\theta} \in \{b_{n,j}^1 = -1\}, b^2} \left( -\frac{1}{\sigma_n^2} \|y - \sqrt{P_1} H^1 \bar{\theta}^1 + \sqrt{P_2} H^2 x^2\| + \frac{1}{2} b^1 L_n^{(a,1,1)} + \frac{1}{2} b^2 L_n^{(a,1,2)} \right).$$

The detector a-posteriori data 344 can be represented as '$L_{n,m}^{(A,1,1)}$'. The superscript can be similar to the detector a-priori data 342 with 'A' representing a-posteriori value and 't' representing processing for the serving signal 112 or the interference signal 120.

The term '$b_{n,m}^1$' can represent a bipolar bit for the 'n'th symbol and the 'm'th bit at an instance of the code word 110. The 'b' and 'L' can indicate the vector corresponding to the 'n'th symbol and the code word 110. The term 'j' can represent an iteration index, such as for the 'j'th instance of the code word 110.

The detection module 306 can further calculate a detector extrinsic data 346. The detector extrinsic data 346 can be based on the detector a-priori data 342 and the detector a-posteriori data 344. The detector extrinsic data 346 can be based on:

$$L_{n,m}^{(ext,1,t)} = L_{n,m}^{(A,1,t)} - L_{n,m}^{(a,1,t)}. \qquad \text{Equation (7)}.$$

The detector extrinsic data 346 can be represented as '$L_{n,m}^{(ext,1,t)}$'.

The detection module 306 can use the first communication unit 216, the second communication unit 236, the first control unit 212, the second control unit 234, or a combination thereof to detect the receiver signal 116. The detection module 306 can store the receiver signal 116, processing result thereof, such as the detector extrinsic data 346 or the detector a-posteriori data 344, or a combination thereof in the first communication unit 216, the second communication unit 236, the first storage unit 214, the second storage unit 246, or a combination thereof.

After detecting the receiver signal 116, the control flow can be passed from the detection module 306 to the arranging module 308. The control flow can pass similarly as described above between the receiver module 302 and the detection module 306 but using processing results of the detection module 306, such as the receiver signal 116, processing result thereof including the detector extrinsic data 346 or the detector a-posteriori data 344, or a combination thereof.

The arranging module 308 is configured to rearrange the receiver signal 116 or processing results corresponding thereto. The arranging module 308 can de-interleave the receiver signal 116, the detector extrinsic data 346, the detector a-posteriori data 344, or a combination thereof.

The arranging module 308 can de-interleave based on a method or a process predetermined by the computing system 100, a communication standard, a coding mechanism, or a combination thereof. For example, the arranging module 308 can arrange the receiver signal 116, the detector extrinsic data 346, the detector a-posteriori data 344, or a combination thereof according to the turbo coding scheme or the polar coding scheme. As a more specific example, the arranging module 308 can de-interleave such as for the turbo receiver 140.

After de-interleaving, the control flow can be passed from the arranging module 308 to the decoding module 310. The control flow can pass similarly as described above between the receiver module 302 and the detection module 306 but using processing results of the arranging module 308, such as de-interleaved instance of the receiver signal 116, the detector extrinsic data 346, the detector a-posteriori data 344, or a combination thereof.

The decoding module 310 is configured to decode the receiver signal 116. The decoding module 310 can decode for the serving signal 112, the serving content 108, the code word 110, or a combination thereof. The decoding module 310 can decode according to the decoding target 142 resulting from the selection module 304. The decoding module 310 can decode the receiver signal 116 based on the decoding target 142 for decoding the receiver signal 116 for the serving signal 112 or the interference signal 120 with the interference-aware receiver 136 according to the decoding target 142.

For example, the decoding module 310 can specifically decode for either the serving signal 112 or the interference signal 120 based on or as specified by the decoding target 142. As a more specific example, the decoding module 310 can decode for the serving signal 112 when the decoding target 142 is the serving target 146. Also as a more specific example, the decoding module 310 can decode for the interference signal 120 when the decoding target 142 is the interference target 148.

The decoding module 310 can decode based on a decoder parameter 348. The decoder parameter 348 can include a value utilized by the decoder parameter 348 for decoding a signal. The decoder parameter 348 can include input information, processing results, intermediate information, or a combination thereof specific to the decoding module 310 and the decoding process.

The decoding module 310 can calculate the decoder parameter 348 corresponding to the current target 316, which can become the previous target 318 for a next or subsequent iteration. On the next iteration, the selection module 304 can use the decoder parameter 348 corresponding to the previous target 318 to update or regenerate the current target 316. Details regarding the updating and regenerating of the current target 316 based on the previous target 318 will be described below.

The decoder parameter 348 can include a decoder a-priori data 350. The decoder a-priori data 350 can be can be a prior knowledge for the decoding module 310 about the serving content 108, the serving signal 112, the interference signal 120, the code word 110, the receiver signal 116, a previous processing result, a symbol therein, a bit therein, or a combination thereof.

The decoder a-priori data 350 can be expressed as '$L_{n,m}^{(a,2,t)}$'. The '2' in the superscript can represent the decoding process and the decoding module 310. The term 't' in the superscript can represent the decoding target 142. The decoding module 310 can determine the decoder a-priori data 350 specific for either the serving signal 112 or the interference signal 120 according to the decoding target 142.

The decoder a-priori data 350 can be similar to the detector a-priori data 342, but for the decoding module 310 instead of the detection module 306. For example, the decoder a-priori data 350 can be one or more measures of confidence levels, a LLR value, or a combination thereof.

The decoding module 310 can use the decoder a-priori data 350 based on Equation (4). The decoding module 310 can use the de-interleaved instance of the receiver signal 116, the detector a-posteriori data 344, the detector extrinsic data 346, or a combination thereof as the decoder a-priori data 350.

The decoding module 310 can calculate a decoder a-posteriori data 352, a decoder extrinsic data 354, or a combination thereof as the decoder parameter 348 based on decoding the receiver signal 116 or a derivation thereof resulting from the arranging module 308. The decoder a-posteriori data 352 can be a later knowledge for the decoding module 310 about the serving content 108, the serving signal 112, the interference signal 120, the code word 110, the receiver signal 116, a symbol therein, a bit therein, or a combination thereof. The decoder a-posteriori data 352 can be expressed as '$L_{n,m}^{(A,2,t)}$'.

The decoder a-posteriori data 352 can be one or more measures of confidence levels associated with a likely transmitted symbol or likelihoods for all possible symbols, or the associated bit values, corresponding to an analyzed portion in the receiver signal 116. The decoder a-posteriori data 352 can be a LLR.

The decoder a-posteriori data 352 can be similar to the detector a-posteriori data 344, but for the decoding module 310 instead of the detection module 306. For example, the decoder a-posteriori data 352 can be one or more measures of confidence levels, a LLR value, or a combination thereof.

Also for example, the decoding module 310 can calculate the decoder a-posteriori data 352 based on Equations (5)-(6), but from the perspective of the decoding module 310 instead of the detection module 306. Also for example, the decoding module 310 can calculate the decoder a-posteriori data 352 specific for either the serving signal 112 or the interference signal 120 according to the decoding target 142.

The decoding module 310 can calculate the decoder extrinsic data 354. The decoder extrinsic data 354 can be based on the decoder a-priori data 350 and the decoder a-posteriori data 352. The decoder extrinsic data 354 can be based on Equation (7), but for the decoding module 310 instead of the detection module 306.

The decoding module 310 can decode using the first communication unit 216, the second communication unit 236, the first control unit 212, the second control unit 234, or a combination thereof. The decoding module 310 can further store the decoding result, such as the decoder extrinsic data 354 or the decoder a-posteriori data 352, the receiver signal 116, or a combination thereof in the first communication unit 216, the second communication unit 236, the first storage unit 214, the second storage unit 246, or a combination thereof.

After decoding, the control flow can be passed from the decoding module 310 to the interleaving module 312. The control flow can pass similarly as described above between the receiver module 302 and the detection module 306 but using the decoding output of the decoding module 310, such as the decoder extrinsic data 354, the decoder a-posteriori data 352, or a combination thereof.

The interleaving module 312 is configured to adjust or rearrange for interleaving the output of the decoding module 310, such as the decoder extrinsic data 354, the decoder a-posteriori data 352, or a combination thereof. The interleaving module 312 can be similar to the arranging module 308. The interleaving module 312 can implement an opposite or a complementary method or process as the arranging module

308. The interleaving module 312 can interleave according to the predetermined coding scheme.

After interleaving, the control flow can be passed from the interleaving module 312 to the selection module 304. The control flow can pass similarly as described above between the receiver module 302 and the detection module 306 but using processing results of interleaving module 312, such as an interleaved instance of the decoder parameter 348, such as the decoder a-posteriori data 352 or the decoder extrinsic data 354, or the decoder parameter 348 associated with the detector a-priori data 342.

The detection module 306 can use the interleaved instance of the decoder parameter 348 as the detector a-priori data 342. The detection module 306 can use the interleaved results for the next iteration, next instance of the code word 110, next instance of the processed transmitter, next instance of the communication block, or a combination thereof.

The selection module 304 can utilize the switch module 330 to generate the decoding target 142 for iterations between the initial iteration 322 and the final iteration 324. The switch module 330 can dynamically generate the decoding target 142. The switch module 330 can generate the decoding target 142 for the current target 316 based on the previous target 318, the decoder parameter 348 of the previous iteration, or a combination thereof.

The switch module 330 can calculate the mutual information 150 of FIG. 1. The switch module 330 can calculate the mutual information based on the receiver signal 116. The switch module 330 can calculate the mutual information 150 for the decoder parameter 348 of the decoding module 310 from the decoding process for the receiver signal 116 occurring for the previous iteration.

The switch module 330 can calculate the mutual information 150 by approximating the mutual information according to:

$$I_L \approx 1 - \frac{1}{N} \sum_{n=1}^{N} H_b\left(\frac{e^{-|L|/2}}{e^{-|L|/2} + e^{+|L|/2}}\right).$$ Equation (8)

The mutual information 150 can be represented as '$I_L$'. The decoder parameter 348, such as the decoder a-priori data 350, the decoder a-posteriori data 352, the decoder extrinsic data 354, an interleaved instance thereof associated with the detector a-priori data 342, or a combination thereof can be represented as 'L'.

The switch module 330 can further dynamically calculate a mutual-expectation threshold 356, a mutual-minimum threshold 358, or a combination thereof of the switch criterion 164 of FIG. 1 for generating the decoding target 142. The switch module 330 can dynamically calculate the mutual-expectation threshold 356, the mutual-minimum threshold 358, or a combination thereof based on the coding gain 152.

The mutual-expectation threshold 356 is a representation of an expected level of the mutual information 150 for generating the decoding target 142. The mutual-expectation threshold 356 can be represented as '$\beta$'.

The mutual-minimum threshold 358 is a representation of a minimum level of the mutual information 150 for generating the decoding target 142. The mutual-minimum threshold 358 can represent the minimum level of the mutual information 150 that a single decoding operation would at least achieve. The mutual-minimum threshold 358 can be represented as '$\gamma$'.

It has been discovered that the decoding target 142 based on the coding gain 152 provides increased processing efficiency. The coding gain 152 based on the modulation-coding scheme can quantify and capture condition or situation relevant to the receiver signal 116 in processing and decoding the receiver signal 116.

The switch module 330 can include a table, an equation, a process or a method, or a combination thereof for calculating the mutual-expectation threshold 356, the mutual-minimum threshold 358, or a combination thereof. The switch module 330 can include a table, an equation, a process or a method, or a combination thereof utilizing the modulation-coding scheme, the coding gain 152, or a combination thereof as an input to calculate the mutual-expectation threshold 356, the mutual-minimum threshold 358, or a combination thereof.

For example, with relatively low instance of the serving scheme 126, the interference scheme 128, or a combination thereof, the coding gain 152, such as the serving gain or the interference gain 158, can be relatively big. Accordingly, the switch module 330 can calculate the mutual-expectation threshold 356 to be relatively high. Also for example, with relatively high instance of the serving scheme 126, the interference scheme 128, or a combination thereof, the switch module 330 can calculate the mutual-expectation threshold 356 to be relatively low.

The switch module 330 can utilize or implement the switch criterion 164 to generate the decoding target 142 based on the mutual information 150. The switch module 330 can further utilize or implement the switch criterion 164 to generate the decoding target 142 based on the dynamically calculated instance of the mutual-expectation threshold 356, the mutual-minimum threshold 358, or a combination thereof. The switch module 330 can compare the mutual information 150 to the mutual-expectation threshold 356, the mutual-minimum threshold 358, or a combination thereof in generating the decoding target 142.

The switch module 330 can generate the decoding target 142 by generating the current target 316 different from the previous target 318 when the mutual information 150 based on the decoder parameter 348 of the previous iteration is outside of a range between the mutual-expectation threshold 356 and the mutual-minimum threshold 358 based on the coding gain 152. For example, the switch module 330 can generate the current target 316 different from the previous target 318 when the mutual information 150 is above the mutual-expectation threshold 356.

Also for example, the switch module 330 can generate the current target 316 different from the previous target 318 when the mutual information 150 is below the mutual-minimum threshold 358. Also for example, the switch module 330 can generate the current target 316 identical to the previous target 318 when the mutual information 150 is between the mutual-minimum threshold 358 and the mutual-expectation threshold 356.

The switch module 330 can generate the current target 316 different from the previous target 318 when the previous decoding process resulted in relatively poor performance as indicated by the mutual information 150 below the mutual-minimum threshold 358. The switch module 330 can generate the current target 316 different from the previous target 318 when the previous decoding process resulted in relatively good performance as indicated by the mutual information 150 above the mutual-expectation threshold 356. The switch module 330 can generate the current target 316 same as the previous target 318 when the previous decoding process exceeded the minimum but with possibility of improving the result.

It has been discovered that the decoding target 142 based on the mutual information 150 from the decoder parameter 348 corresponding to the previous iteration provides increased robustness. The decoding target 142 based on the mutual information 150 associated with the previous iteration can adapt accord to each iteration of the decoding process and select the decoding target 142 that can provide the most processing benefit.

The switch module 330 can generate the current target 316 until the final iteration 324. The final module 332 can generate the current target 316 for the final iteration 324 as described above.

The switch module 330 can use the first communication unit 216, the second communication unit 236, the first control unit 212, the second control unit 234, or a combination thereof to generate the decoding target 142. The switch module 330 can store the decoding target 142 or a processing result thereof in the first communication unit 216, the second communication unit 236, the first storage unit 214, the second storage unit 246, or a combination thereof.

It has been discovered that the decoding target 142 based on the switch criterion 164 provides reduced processing time. The decoding target 142 generated based on the switch criterion 164 can provide flexibility for the decoding process without predetermined processing sequence or restriction. The flexibility can improve the results per each iteration or decoding session, which can reduce the number of total iterations.

It has further been discovered that the current target 316 same as the previous target 318 when the mutual information 150 is within a range between the mutual-expectation threshold 356 and the mutual-minimum threshold 358 provides reduced error rate. The current target 316 can adjust to conditions and situations where the previous decoding result likely can yield further improvements from reprocessing. The range can quantify and capture such conditions and situations and maximize decoding process, which can reduce errors resulting from the decoding process.

It has further been discovered that the current target 316 different from the previous target 318 when the mutual information 150 is outside of a range between the mutual-expectation threshold 356 and the mutual-minimum threshold 358 provides reduced error rate. The current target 316 can adjust to conditions and situations where the previous decoding result is good and likely fully saturated or when the previous decoding result indicates insufficient information for the decoding process. In either case, repeating the previous target 318 is unlikely to yield any improvements and the current target 316 different from the previous target 318 can optimize the decoding results of the current iteration.

Figure 4:
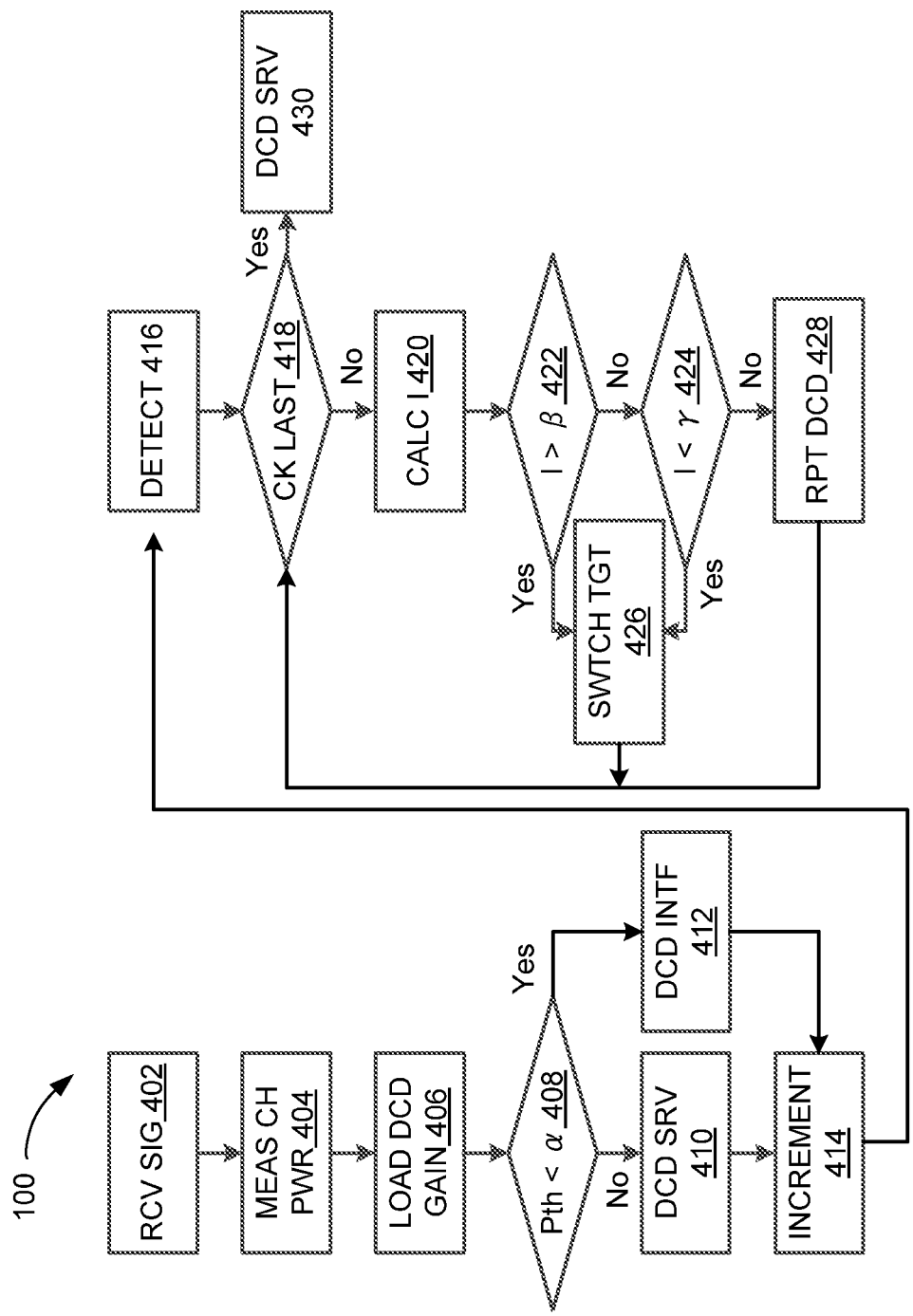
FIG. 4 is an exemplary operational flowchart of the computing system of FIG. 1.

Referring now to FIG. 4, therein is shown is an exemplary operational flowchart 400 of the computing system 100 of FIG. 1. The exemplary operational flowchart 400 can include receive signal in a box 402. The computing system 100 can receive signal by using the receiver module 302 of FIG. 3 to receive the receiver signal 116 of FIG. 1 at the first device 102 of FIG. 1. The computing system 100 can use the receiver module 302 to receive the receiver signal 116 including the serving signal 112 of FIG. 1, the interference signal 120 of FIG. 1, or a combination thereof. Details of the receiver module 302 have been described above.

The exemplary operational flowchart 400 can include measure channel power in a box 404. The computing system 100 can measure channel power by using the receiver module 302 to calculate the serving channel estimate 118 of FIG. 1, the interference channel estimate 124 of FIG. 1, any power measurement associated thereto, or a combination thereof. Details of the receiver module 302 have been described above.

The exemplary operational flowchart 400 can include load decoding gain in a box 406. The computing system 100 can use the gain module 326 of FIG. 3 to load decoding gain. The computing system 100 can use the gain module 326 to calculate the coding gain 152 of FIG. 1 and load a set of estimated instances of the coding gain 152, such as the serving gain 156 of FIG. 1, the interference gain 158 of FIG. 1, or a combination thereof. The gain module 326 can calculate the coding gain 152 based on the modulation coding scheme, such as the serving scheme 126 of FIG. 1, the interference scheme 128 of FIG. 1, or a combination thereof. Details of the gain module 326 have been described above.

The exemplary operational flowchart 400 can include compare power for initial iteration in a box 408. The computing system 100 can use the initialization module 328 of FIG. 3 to compare power for initial iteration. The computing system 100 can use the initialization module 328 to calculate the power measurement 334 of FIG. 3, compare the power measurement 334 to the serving-noise comparison threshold 340 of FIG. 3, or a combination thereof. Details of the initialization module 328 have been described above.

The exemplary operational flowchart 400 can include decode for serving signal in a box 410. The computing system 100 can decode for serving signal by using the initialization module 328 to generate the decoding target 142 of FIG. 1 as the serving target 146 of FIG. 1 when the power measurement 334 is not less than the serving-noise comparison threshold 340 for the initial iteration 322 of FIG. 3. The decoding module 310 of FIG. 3 can accordingly decode for the serving signal 112 based on the serving target 146 selected as the decoding target 142. Details of the initialization module 328 and the decoding module 310 have been described above.

The exemplary operational flowchart 400 can include decode for interference signal in a box 412. The computing system 100 can decode for interference signal by using the initialization module 328 to generate the decoding target 142 as the interference target 148 of FIG. 1 when the power measurement 334 is less than the serving-noise comparison threshold 340 for the initial iteration 322. The decoding module 310 can accordingly decode for the interference signal 120 based on the interference target 148 selected as the decoding target 142. Details of the initialization module 328 and the decoding module 310 have been described above The exemplary operational flowchart 400 can include increment iteration index in a box 414. The computing system 100 can use the selection module 304 of FIG. 3 to increment the iteration index by incrementing and controlling the iteration tracker 320 of FIG. 3. Details of the selection module 304 have been described above.

The exemplary operation flow chart 400 can include detect signal in a box 416. The computing system 100 can use the detection module 306 of FIG. 3 to detect signal. The detection module 306 can detect the receiver signal 116. The detection module 306 can use updated instance of the detector a-priori data 342 of FIG. 3 to detect the receiver signal 116 and calculate the detector a-posteriori data 344 of FIG. 3, the detector extrinsic data 346 of FIG. 3, or a combination thereof accordingly. Details of the detection module 306 have been described above.

The exemplary operational flowchart 400 can include check for final iteration in a box 418. The computing system 100 can use the selection module 304 to check for final iteration. The selection module 304 can compare the iteration tracker 320 to the final iteration 324.

The exemplary operational flowchart 400 can include calculate mutual information in a box 420. The computing system 100 can use the switch module 330 of FIG. 3 to calculate the mutual information 150 of FIG. 1 when the iteration tracker 320 does not indicate the final iteration 324. Details of the switch module 330 have been described above.

The exemplary operational flowchart 400 can include compare mutual information to expected level in a box 422. The computing system 100 can use the switch module 330 to compare mutual information to expected level. The switch module 330 can calculate the mutual-expectation threshold 356 of FIG. 3. The switch module 330 can compare the mutual-expectation threshold 356 and the mutual information 150. Details regarding the switch module 330 have been described above.

The exemplary operational flowchart 400 can include compare mutual information to minimum level in a box 424. The computing system 100 can use the switch module 330 to compare mutual information to minimum level. The switch module 330 can calculate the mutual-minimum threshold 358 of FIG. 3. The switch module 330 can compare the mutual-minimum threshold 358 and the mutual information 150. The switch module 330 can calculate and compare the mutual-minimum threshold 358 when the mutual information is not greater than the mutual-expectation threshold 356. Details regarding the switch module 330 have been described above.

The exemplary operational flowchart 400 can include switch target in a box 426. The computing system 100 can use the switch module 330 to switch target. The switch module 330 can generate the current target 316 of FIG. 3 different from the previous target 318 of FIG. 3, selecting between the serving target 146 and the interference target 148, to switch target. The switch module 330 can switch the decoding target 142 when the mutual information 150 is greater than the mutual-expectation threshold 356 or when the mutual information 150 is less than the mutual-minimum threshold 358.

The exemplary operational flowchart 400 can include repeat decoding in a box 428. The computing system 100 can use the switch module 330 to repeat decoding. The switch module 330 can generate the current target 316 same as or identical to the previous target 318 to repeat decoding. The switch module 330 can repeat decoding when the mutual information 150 is not greater than the mutual-expectation threshold 356, the mutual information 150 is not less than the mutual-minimum threshold 358, or a combination thereof.

The exemplary operational flowchart 400 can include decode serving signal for final iteration in a box 430. The computing system 100 can use the final module 332 of FIG. 3 to decode serving signal for final iteration. The final module 332 can generate the decoding target 142 as the serving target 146 for the final iteration 324. Details of the final module 332 have been described above.

The decoding module 310 can decode the receiver signal 116 according to the decoding target 142 or the current target 316. The decoding module 310 can decode the receiver signal 116 for the serving signal 112 or the interference signal 120 according to the current target 316. The decoding module 310 can decode using the decoder a-priori data 350 of FIG. 3. The decoding module 310 can calculate the decoder a-posteriori data 352 of FIG. 3, the decoder extrinsic data 354 of FIG. 3, or a combination thereof. Details regarding the switch module 330, the final module 332, and the decoding module 310 have been described above.

Figure 5:
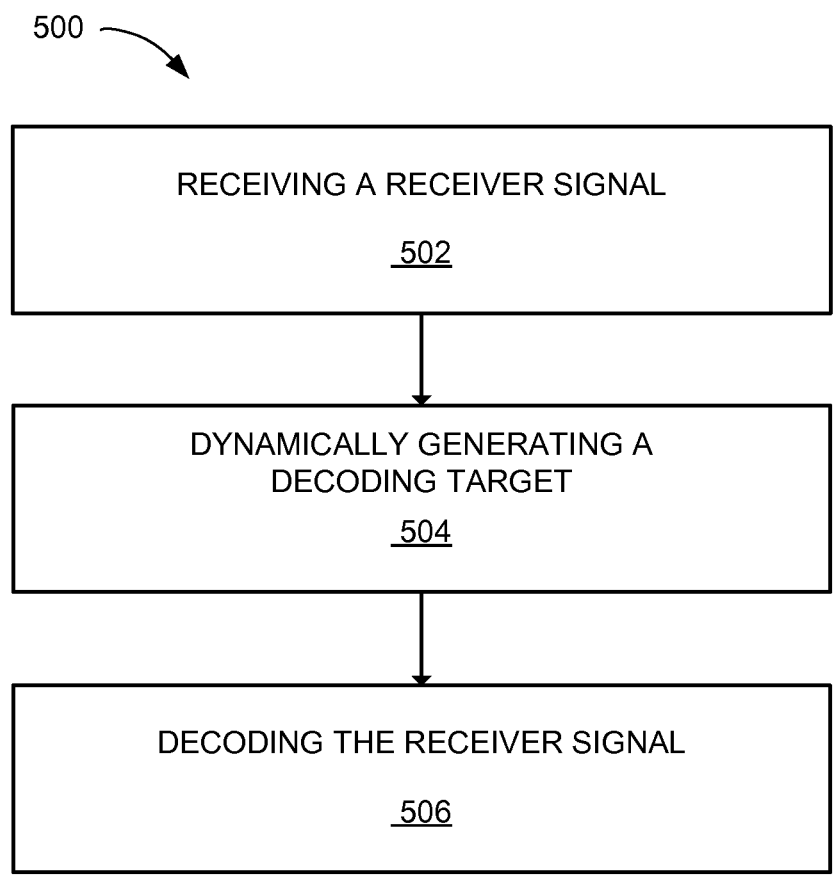
FIG. 5 is a flow chart of a method of operation of a computing system in a further embodiment of the present invention.

Referring now to FIG. 5, therein is shown a flow chart 500 of a method of operation of a computing system in a further embodiment of the present invention. The method 500 includes: receiving a receiver signal for representing a serving signal and an interference signal in a block 502; dynamically generating a decoding target for decoding of the receiver signal in a block 504; and decoding the receiver signal based on the decoding target for decoding the receiver signal for the serving signal or the interference signal with an interference-aware receiver according to the decoding target in a block 506.

The modules described in this application can be hardware implementation or hardware accelerators, including passive circuitry, active circuitry, or both, in the first communication unit 216 of FIG. 2, the second communication unit 236 of FIG. 2, the first control unit 212 of FIG. 2, the second control unit 238 of FIG. 2, or a combination thereof. The modules can also be hardware implementation or hardware accelerators, including passive circuitry, active circuitry, or both, within the first device 102 of FIG. 1, the second device 106 of FIG. 1, or a combination thereof but outside of the first communication unit 216, the second communication unit 236, the first control unit 212, the second control unit 234, or a combination thereof.

The computing system 100 of FIG. 1 has been described with module functions or order as an example. The computing system 100 can partition the modules differently or order the modules differently. For example, the selection module 304 of FIG. 3 can be a sub-module of the decoding module 310 of FIG. 3 preceding or following the decoding process. As for example, the determining and process of the iteration tracker 320 of FIG. 3 can be implemented as a separate module outside of the selection module 304.

For illustrative purposes, the various modules have been described as being specific to the first device 102, the second device 106, or a combination thereof. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be stored in the non-transitory computer readable medium. The first communication unit 216, the second communication unit 236, the first control unit 212, the second control unit 234, or a combination thereof can represent the non-transitory computer readable medium. The first communication unit 216, the second communication unit 236, the first control unit 212, the second control unit 234, or a combination thereof, or a portion therein can be removable from the first device 102, the second device 106, or a combination thereof. Examples of the non-transitory computer readable medium can be a non-volatile memory card or stick, an external hard disk drive, a tape cassette, or an optical disk.

The physical transformation of the receiver signal 116 of FIG. 1 from utilizing the decoding target 142 for the decoding process results in the movement in the physical world, such as content displayed or recreated for the user on the first user device from processing the serving content therein. The content reproduced on the first device 102, such as navigation information or voice signal of a caller, can influence the user's movement, such as following the navigation information or replying back to the caller. Movement in the physical world results in changes to the channel estimates, the geographic location of the first device 102, the interference signal 120, or a combination thereof, which can be fed back into the computing system 100 and influence the decoding sequence with the decoding target 142.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
   an inter-device interface configured to receive a receiver signal for representing a serving signal and an interference signal;
   a communication unit, coupled to the inter-device interface, configured to:
   dynamically generate a decoding target for selecting either the serving signal or the interference signal for processing during an iteration in decoding the receiver signal, and
   decode the receiver signal based on the decoding target for targeting the serving signal or the interference signal for the iteration according to the decoding target in decoding the receiver signal with an interference-aware receiver.

2. The system as claimed in claim 1 wherein the communication unit is configured to:
   calculate a power measurement for the receiver signal for an initial iteration for decoding the receiver signal; and
   generate the decoding target based on the power measurement for decoding the receiver signal for greater of the serving signal or the interference signal according to the power measurement.

3. The system as claimed in claim 1 wherein the communication unit is configured to generate the decoding target based on a ratio-sum or a sum ratio for representing the serving signal, the interference signal, or a combination thereof corresponding to the receiver signal.

4. The system as claimed in claim 1 wherein the communication unit is configured to:
   calculate a mutual information based on the receiver signal; and
   generate the decoding target based on the mutual information.

5. The system as claimed in claim 1 wherein the communication unit is configured to:
   calculate a decoder parameter corresponding to a previous target based on decoding the receiver signal; and
   generate the decoding target corresponding to a current target based on the decoder parameter.

6. The system as claimed in claim 1 wherein the communication unit is configured to:
   calculate a coding gain based on the receiver signal; and
   generate the decoding target between a serving target and an interference target based on the coding gain for decoding the receiver signal for the serving signal with the serving target or for the interference signal with the interference target.

7. The system as claimed in claim 6 wherein the communication unit is configured to:
   calculate a mutual information based on the receiver signal;
   dynamically calculate a mutual-expectation threshold based on the coding gain; and
   generate a current target different from a previous target when the mutual information is above the mutual-expectation threshold.

8. The system as claimed in claim 6 wherein the communication unit is configured to:
   calculate a mutual information based on the receiver signal;
   dynamically calculate a mutual-minimum threshold based on the coding gain; and
   generate a current target different from a previous target when the mutual information is below the mutual-minimum threshold.

9. The system as claimed in claim 6 wherein the communication unit is configured to:
   calculate a mutual information based on the receiver signal;
   dynamically calculate a mutual-minimum threshold based on the coding gain;
   dynamically calculate a mutual-expectation threshold based on the coding gain; and
   generate a current target identical to a previous target when the mutual information is between the mutual-minimum threshold and the mutual-expectation threshold.

10. The system as claimed in claim 6 wherein the communication unit includes:
    determine a serving scheme based on the receiver signal for representing the serving signal;
    determine an interference scheme based on the receiver signal for representing the interference signal; and
    generate the decoding target based on the serving scheme and the interference scheme.

11. A method of operation of a computing system comprising:
    receiving a receiver signal for representing a serving signal and an interference signal;
    dynamically generating a decoding target for selecting either the serving signal or the interference signal for processing during an iteration in decoding the receiver signal; and
    decoding the receiver signal based on the decoding target for targeting the serving signal or the interference signal for the iteration according to the decoding target in decoding the receiver signal with an interference-aware receiver.

12. The method as claimed in claim 11 further comprising:
    calculating a power measurement for the receiver signal for an initial iteration for decoding the receiver signal; and
    wherein:
    generating the decoding target includes generating the decoding target based on the power measurement for decoding the receiver signal for greater of the serving signal or the interference signal according to the power measurement.

13. The method as claimed in claim 11 wherein generating the decoding target includes generating the decoding target based on a ratio-sum or a sum ratio for representing the serving signal, the interference signal, or a combination thereof corresponding to the receiver signal.

14. The method as claimed in claim 11 further comprising:
    calculating a mutual information based on the receiver signal; and
wherein:
    generating the decoding target includes generating the decoding target based on the mutual information.

15. The method as claimed in claim 11 wherein:
    decoding the receiver signal includes calculating a decoder parameter corresponding to a previous target based on decoding the receiver signal; and
    generating the decoding target includes generating the decoding target corresponding to a current target based on the decoder parameter.

16. A non-transitory computer readable medium including instructions for a computing system comprising:
    receiving a receiver signal for representing a serving signal and an interference signal;
    dynamically generating a decoding target for selecting either the serving signal or the interference signal for processing during an iteration in decoding the receiver signal; and
    decoding the receiver signal based on the decoding target for targeting the serving signal or the interference signal for the iteration according to the decoding target in decoding the receiver signal with an interference-aware receiver.

17. The non-transitory computer readable medium as claimed in claim 16 further comprising:
    calculating a power measurement for the receiver signal for an initial iteration for decoding the receiver signal; and
wherein:
    generating the decoding target includes generating the decoding target based on the power measurement for decoding the receiver signal for greater of the serving signal or the interference signal according to the power measurement.

18. The non-transitory computer readable medium as claimed in claim 16 wherein generating the decoding target includes generating the decoding target based on a ratio-sum or a sum ratio for representing the serving signal, the interference signal, or a combination thereof corresponding to the receiver signal.

19. The non-transitory computer readable medium as claimed in claim 16 further comprising:
    calculating a mutual information based on the receiver signal; and
wherein:
    generating the decoding target includes generating the decoding target based on the mutual information.

20. The non-transitory computer readable medium as claimed in claim 16 wherein:
    decoding the receiver signal includes calculating a decoder parameter corresponding to a previous target based on decoding the receiver signal; and
    generating the decoding target includes generating the decoding target corresponding to a current target based on the decoder parameter.

* * * * *